(12) United States Patent
Unno

(10) Patent No.: US 9,830,542 B2
(45) Date of Patent: Nov. 28, 2017

(54) PRINTING APPARATUS, CONTROLLING METHOD THEREOF AND STORAGE MEDIUM

(71) Applicant: CANON KABUSHIKI KAISHA, Tokyo (JP)

(72) Inventor: Koichi Unno, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/801,983

(22) Filed: Jul. 17, 2015

(65) Prior Publication Data

US 2016/0034800 A1 Feb. 4, 2016

(30) Foreign Application Priority Data

Jul. 31, 2014 (JP) .................................. 2014-157045

(51) Int. Cl.
| | |
|---|---|
| *G06K 15/00* | (2006.01) |
| *B41J 29/00* | (2006.01) |
| *H04N 1/00* | (2006.01) |
| *B42C 1/00* | (2006.01) |
| *G03G 15/00* | (2006.01) |
| *B42C 19/02* | (2006.01) |

(52) U.S. Cl.
CPC ............ *G06K 15/403* (2013.01); *B41J 29/00* (2013.01); *B42C 1/00* (2013.01); *G03G 15/6538* (2013.01); *H04N 1/00* (2013.01); *B42C 19/02* (2013.01)

(58) Field of Classification Search
None
See application file for complete search history.

(56) References Cited

U.S. PATENT DOCUMENTS

| 7,263,328 | B2 | 8/2007 | Asai et al. |
| 7,810,804 | B2 * | 10/2010 | Mori ................... B65H 31/24 271/176 |
| 7,907,887 | B2 | 3/2011 | Asai et al. |
| 8,672,312 | B2 | 3/2014 | Nonaka |

(Continued)

FOREIGN PATENT DOCUMENTS

| CN | 1702565 A | 11/2005 |
| CN | 1911769 A | 2/2007 |

(Continued)

OTHER PUBLICATIONS

Office Action dated Apr. 1, 2017, in Chinese Patent Application No. 201510450493.3.

*Primary Examiner* — Dung Tran
(74) *Attorney, Agent, or Firm* — Fitzpatrick, Cella, Harper & Scinto

(57) ABSTRACT

A printing apparatus includes a printing unit that prints images on sheets, a sheet processing unit that executes bookbinding processing on sheets on which images have been printed by the printing unit, a stack control unit that stacks, in a stacking unit, bookbinding products on which bookbinding processing has been executed by the sheet processing unit, a setting unit that sets whether or not to activate a stacking limit of bookbinding products to be stacked on the stacking unit by the stack limiting unit, and a control unit that performs control so as to stop stacking in the stacking unit by the stack control unit in accordance with the stacking limit in the case where the stacking limit of bookbinding products has been set to activated by the setting unit.

27 Claims, 18 Drawing Sheets

(56) References Cited

U.S. PATENT DOCUMENTS

| | | | |
|---|---|---|---|
| 8,752,818 B2* | 6/2014 | Min | B42C 19/08 |
| | | | 270/32 |
| 8,874,022 B2* | 10/2014 | Kayaba | B65H 29/6618 |
| | | | 271/220 |
| 9,259,956 B2 | 2/2016 | Asai et al. | |
| 9,428,362 B2* | 8/2016 | Kubota | B65H 45/18 |
| 2007/0035142 A1* | 2/2007 | Yoshie | B65G 57/03 |
| | | | 294/67.1 |
| 2007/0090582 A1* | 4/2007 | Awano | B65H 29/66 |
| | | | 270/37 |
| 2009/0224467 A1 | 9/2009 | Mori | |
| 2010/0078883 A1* | 4/2010 | Uchida | G03G 15/5075 |
| | | | 271/279 |
| 2010/0148416 A1 | 6/2010 | Kayaba et al. | |
| 2010/0329821 A1* | 12/2010 | Sasaki | B42B 5/103 |
| | | | 412/1 |
| 2011/0199644 A1 | 8/2011 | Asai et al. | |
| 2012/0093613 A1* | 4/2012 | Hattori | B42C 9/0037 |
| | | | 412/20 |
| 2013/0214470 A1 | 8/2013 | Yokomizo | |
| 2014/0153937 A1 | 6/2014 | Unno | |
| 2016/0031669 A1* | 2/2016 | Mori | B65H 31/22 |
| | | | 270/1.01 |

FOREIGN PATENT DOCUMENTS

| | | |
|---|---|---|
| CN | 103287912 A | 9/2013 |
| JP | 2010-168134 A | 8/2010 |
| JP | 2012-086377 A | 5/2012 |

\* cited by examiner

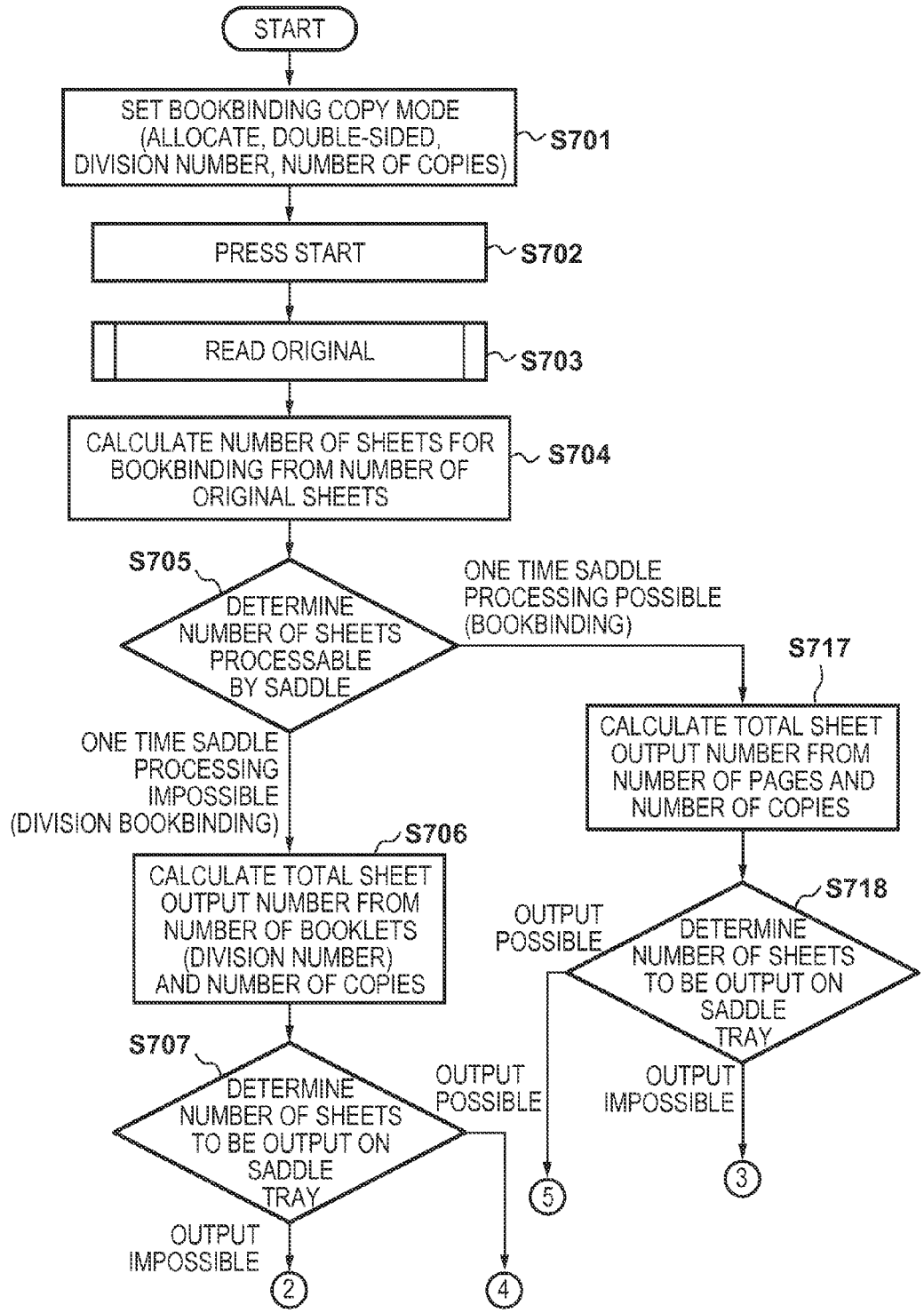

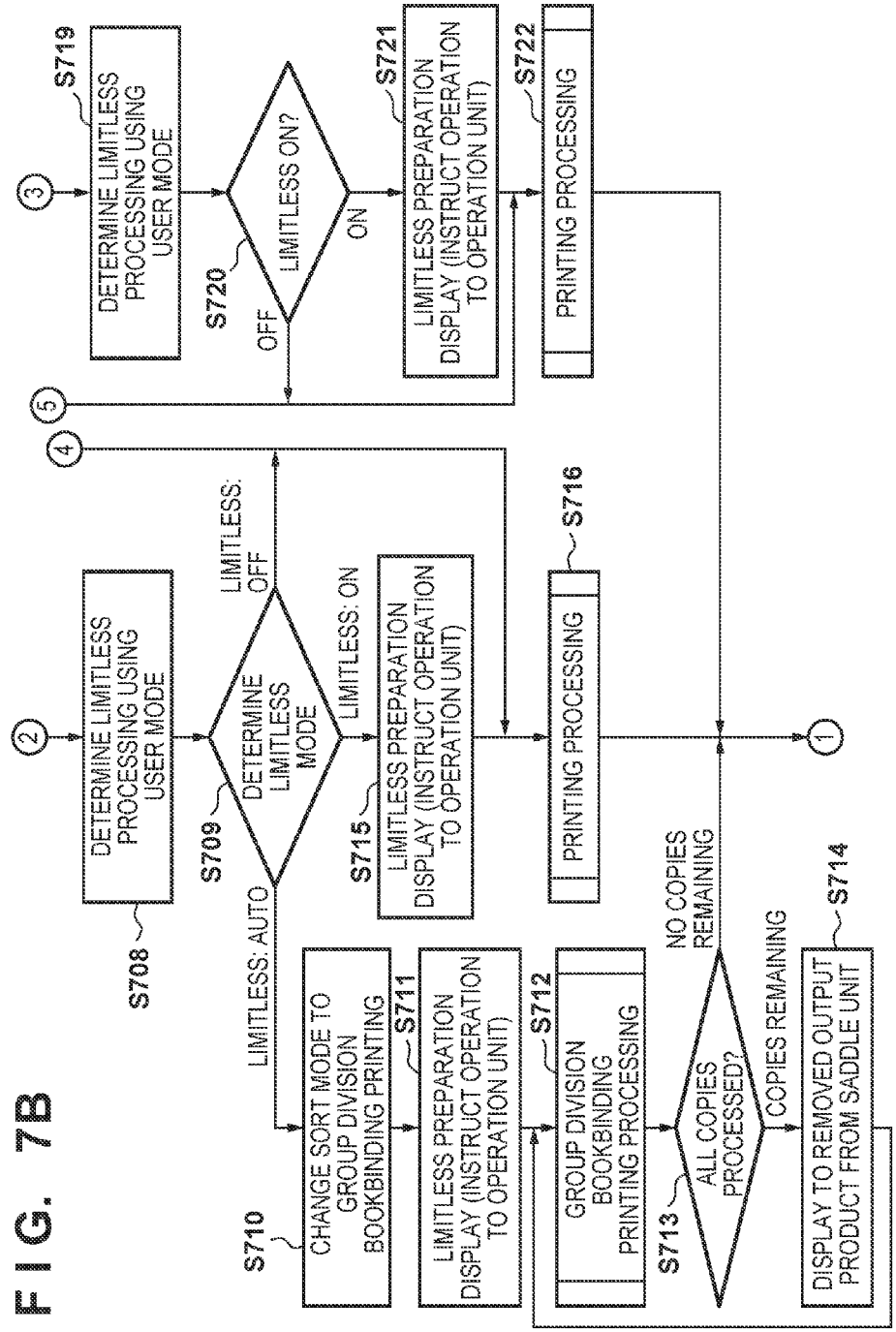

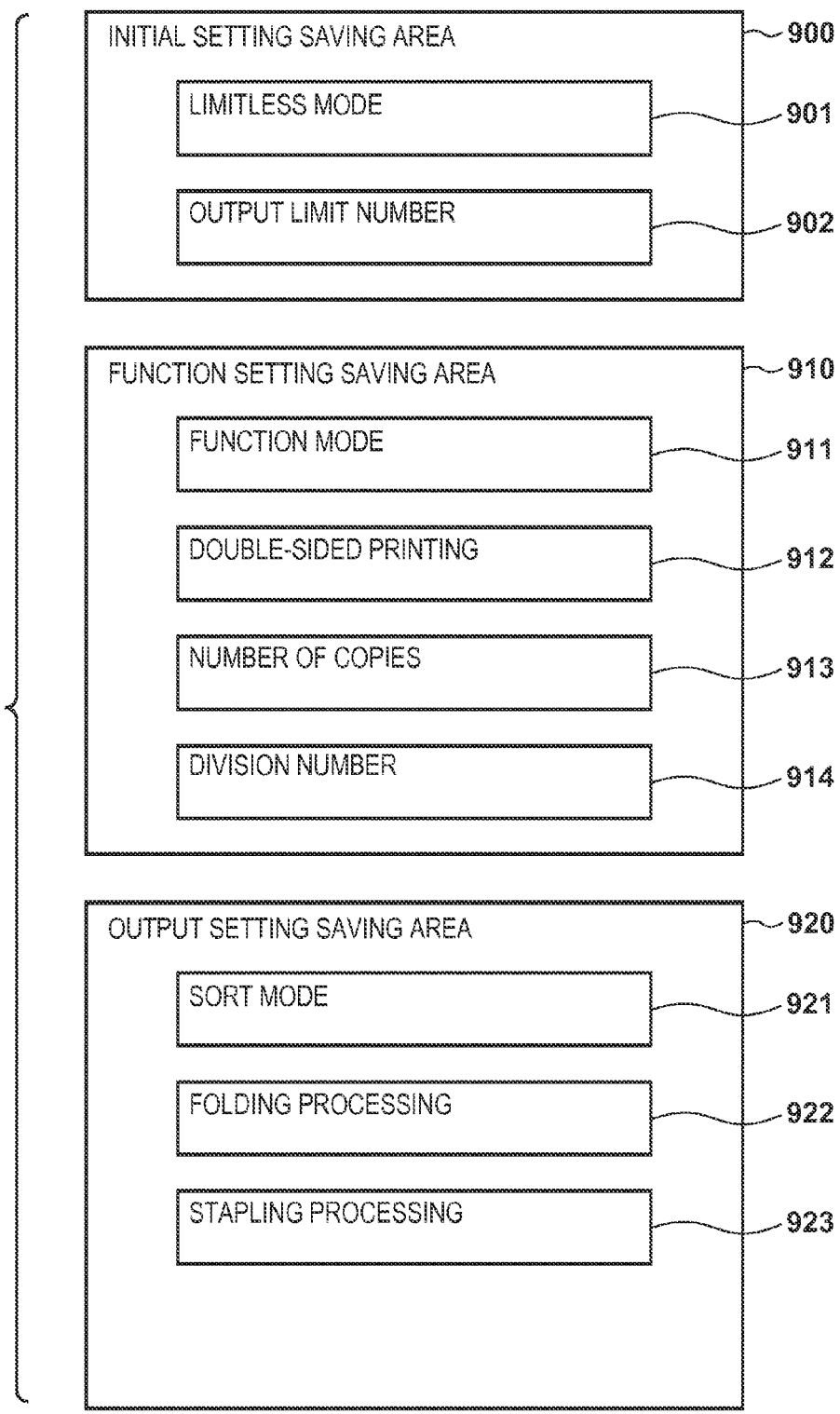

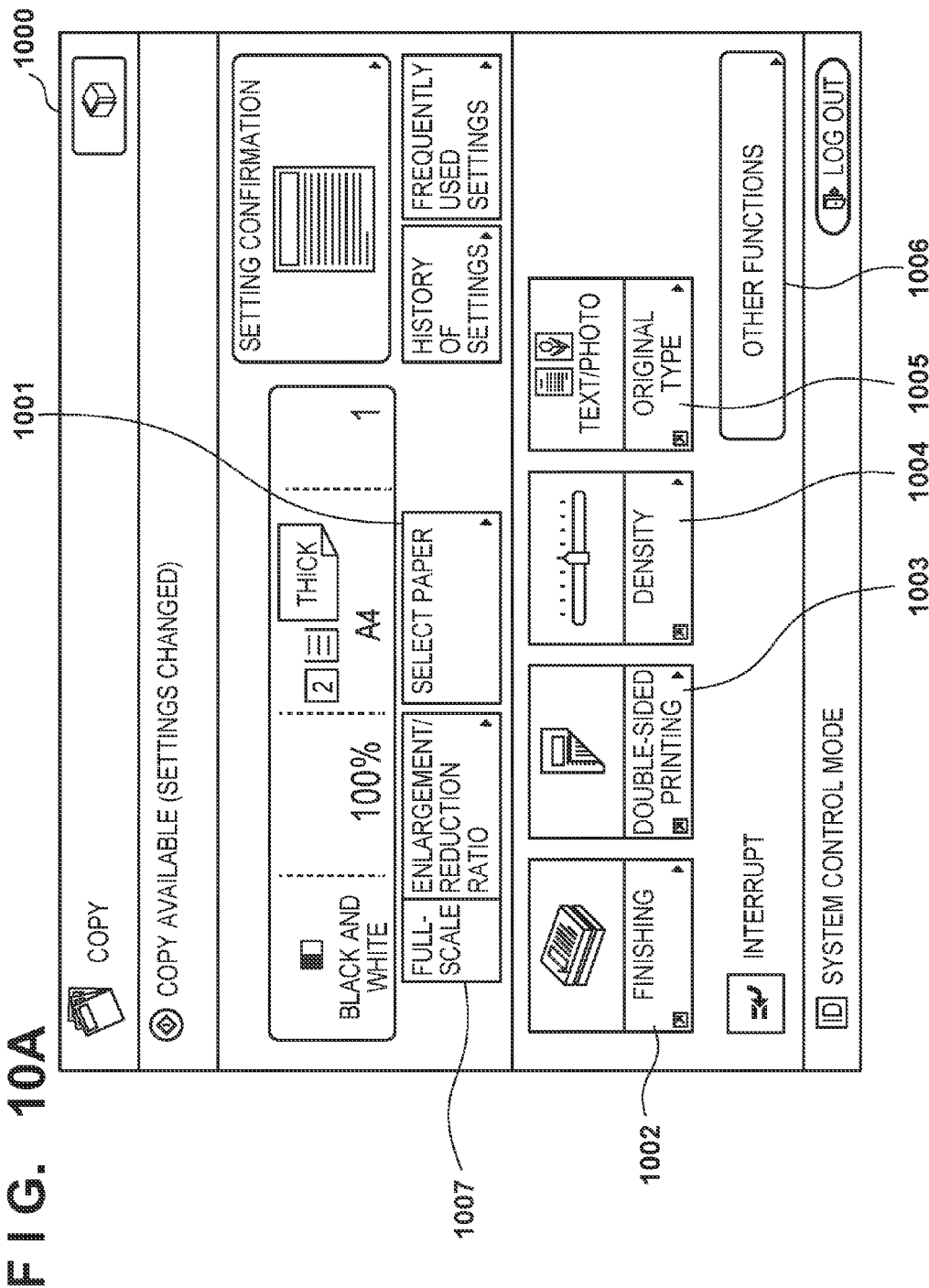

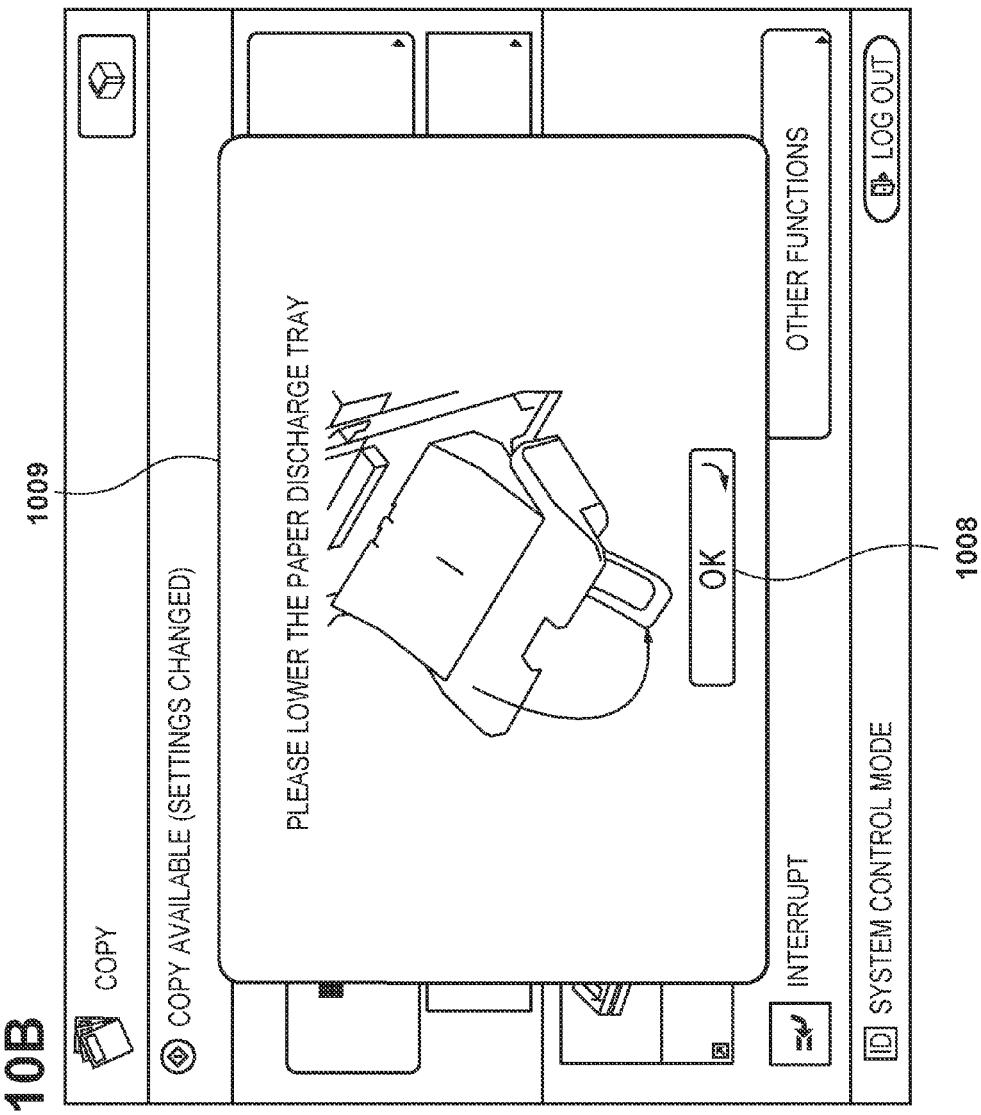

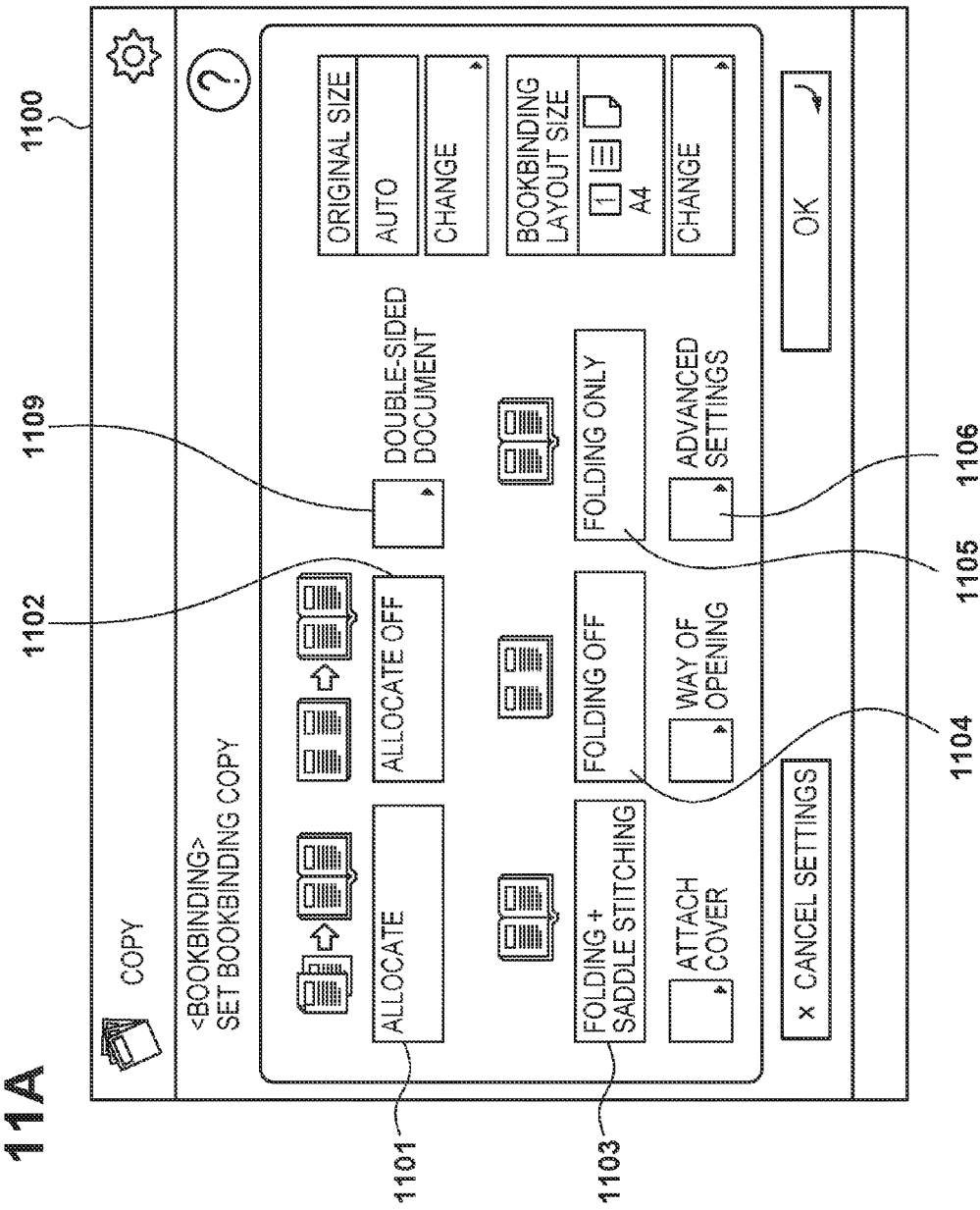

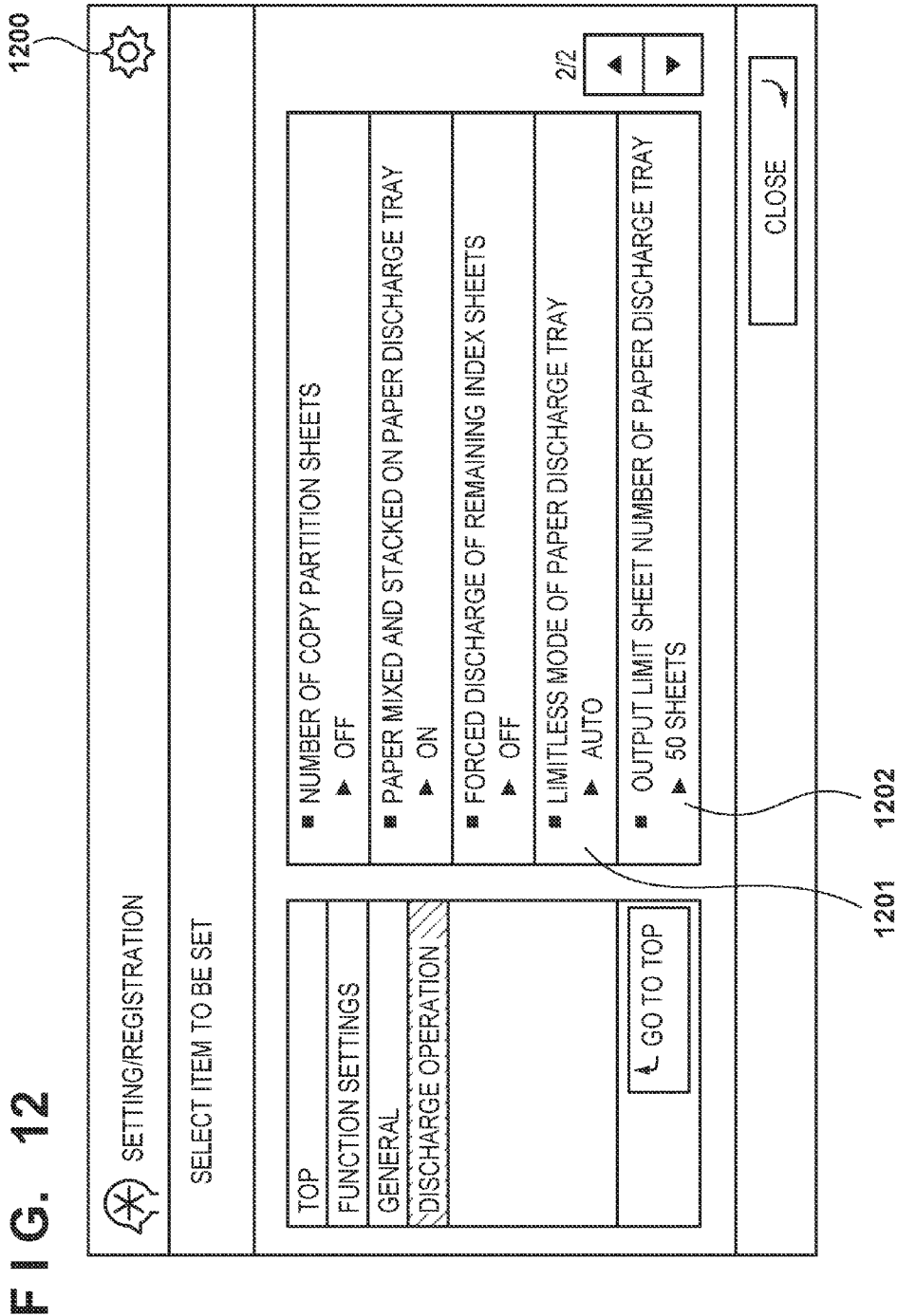

PRINTING APPARATUS, CONTROLLING METHOD THEREOF AND STORAGE MEDIUM

BACKGROUND OF THE INVENTION

Field of the Invention

The present invention relates to a printing apparatus, a control method thereof and a storage medium.

Description of the Related Art

Conventionally, some printing apparatuses such as multifunction peripherals have a post-processing apparatus for performing post processing such as stapling and saddle stitch bookbinding on sheets with images printed thereon (Japanese Patent Laid-Open No. 2010-168134).

In the case of performing saddle stitch bookbinding, bookbinding processing is performed one bundle at a time by the post-processing apparatus, and the bookbinding products that have been bookbound are stacked in bundles in a stacking unit of the post-processing apparatus.

The amount of bookbinding products that can be stacked in the stacking unit of the post-processing apparatus is limited, and when the amount of printed products stacked in the stacking unit exceeds that limit, the printing apparatus suspends printing. Thus, a user has to remove the bookbinding products each time this happens. Because printing is suspended many times especially when the amount of bookbinding products is large, the user has to wait in front of the post-processing apparatus until printing is completed in order to remove the bookbinding products.

SUMMARY OF THE INVENTION

The present invention enables realization of a mechanism that reduces the time and effort involved in the user removing bookbinding products many times by releasing the limit to the amount of bookbinding products that can be stacked on a stacking unit.

One aspect of the present invention provides a printing apparatus comprising: a printing unit configured to print images on sheets; a sheet processing unit configured to execute bookbinding processing on sheets on which images have been printed by the printing unit; a stack control unit configured to stack, in a stacking unit, bookbinding products on which bookbinding processing has been executed by the sheet processing unit; a setting unit configured to set whether or not to activate a stacking limit of bookbinding products to be stacked in the stacking unit by the stack control unit; and a control unit configured to perform control so as to stop stacking on the stacking unit by the stack control unit in accordance with the stacking limit, in a case where the stacking limit of bookbinding products has been set to activated by the setting unit.

Another aspect of the present invention provides a printing apparatus comprising: a reading unit configured to read an original; a printing unit configured to print images on sheets in accordance with image data read from the original by the reading unit; a sheet processing unit configured to execute bookbinding processing on sheets on which images have been printed by the printing unit; a limiting unit configured to limit a stackable sheet number of the sheet processing unit; a calculating unit configured to calculate, from image data read by the reading unit, a number of sheets on which images are to be printed by the printing unit in a case of performing bookbind printing; and a control unit configured to divide a book for bookbind printing into a plurality of booklets and cause the printing unit to print images, in a case where the number of sheets to be printed calculated by the calculating unit exceeds a processable sheet number of the sheet processing unit, and to switch, in accordance with a processing mode, between releasing the limiting unit and discharging the sheets to a storage unit disposed outside the sheet processing unit or consecutively printing a required number of copies for each of the plurality of booklets and stacking the sheets on a stacking unit of the sheet processing unit, in a case where the number of sheets to be printed calculated by the calculating unit exceeds the stackable sheet number of the sheet processing unit.

Still another aspect of the present invention provides a method for controlling a printing apparatus that includes: a printing unit configured to print images on sheets; and a sheet processing unit configured to execute bookbinding processing on sheets in which images are printed by the printing unit, the method comprising: stacking bookbinding products on which bookbinding processing has been executed by the sheet processing unit in a stacking unit; setting whether or not to activate a stacking limit of bookbinding products to be stacked in the stacking unit; and performing control so as to stop stacking in the stacking unit in accordance with the stacking limit, in the case where in the stacking limit of bookbinding products has been set to activated.

Yet still another aspect of the present invention provides a method for controlling a printing apparatus that includes: a reading unit configured to read an original; a printing unit configured to print images on sheets in accordance with image data read from the original by the reading unit; a sheet processing unit configured to execute bookbinding processing on sheets on which images have been printed by the printing unit; and a limiting unit configured to limit a stackable sheet number of the sheet processing unit, the method comprising: calculating, from image data read by the reading unit, a number of sheets on which images are to be printed by the printing unit in a case of performing bookbinding printing; and dividing a book for bookbinding printing into a plurality of booklets and causing the printing unit to print images, in a case where the calculated number of sheets to be printed exceeds a processable sheet number of the sheet processing unit, and shifting, in accordance with a processing mode, between releasing the limiting unit and discharging the sheets to a storage unit disposed outside the sheet processing unit or consecutively printing a required number of copies for each of the plurality of booklets and stacking the sheets on a stacking unit of the sheet processing unit, in a case where the calculated number of sheets to be printed exceeds the stackable sheet number of the sheet processing unit.

Still yet another aspect of the present invention provides a non-transitory computer-readable storage medium storing a computer program for causing a computer to execute a method of controlling a printing apparatus, the printing apparatus that includes: a reading unit configured to read an original; a printing unit configured to print images on sheets in accordance with image data read from the original by the reading unit; a sheet processing unit configured to execute bookbinding processing on sheets on which images have been printed by the printing unit; and a limiting unit configured to limit a stackable sheet number of the sheet processing unit, the method comprising: calculating, from image data read by the reading unit, a number of sheets on which images are to be printed by the printing unit in a case of performing bookbinding printing; and dividing a book for bookbinding printing into a plurality of booklets and causing the printing unit to print images, in a case where the calculated number of sheets to be printed exceeds a processable sheet number of the sheet processing unit, and shifting, in accordance with a processing mode, between releasing the limiting unit and discharging the sheets to a storage unit disposed outside the sheet processing unit or consecutively printing a required number of copies for each of the plurality of booklets and stacking the sheets on a stacking unit of the sheet processing unit, in a case where the calculated number of sheets to be printed exceeds the stackable sheet number of the sheet processing unit.

Further features of the present invention will be apparent from the following description of exemplary embodiments with reference to the attached drawings.

BRIEF DESCRIPTION OF THE DRAWINGS

FIGS. 7A and 7B are a flowchart showing a control procedure of a printing apparatus according to one embodiment.

FIG. 9 is a diagram showing a data structure according to one embodiment.

FIGS. 10A and 10B are diagrams showing a setting screen and a user work instruction screen displayed on an operation unit according to one embodiment.

FIGS. 11A and 11B are diagrams showing setting screens of bookbind printing displayed on an operation unit according to one embodiment.

FIG. 12 is a diagram showing a setting screen related to a paper discharging tray setting displayed on an operation unit according to one embodiment.

DESCRIPTION OF THE EMBODIMENTS

Figure 1:
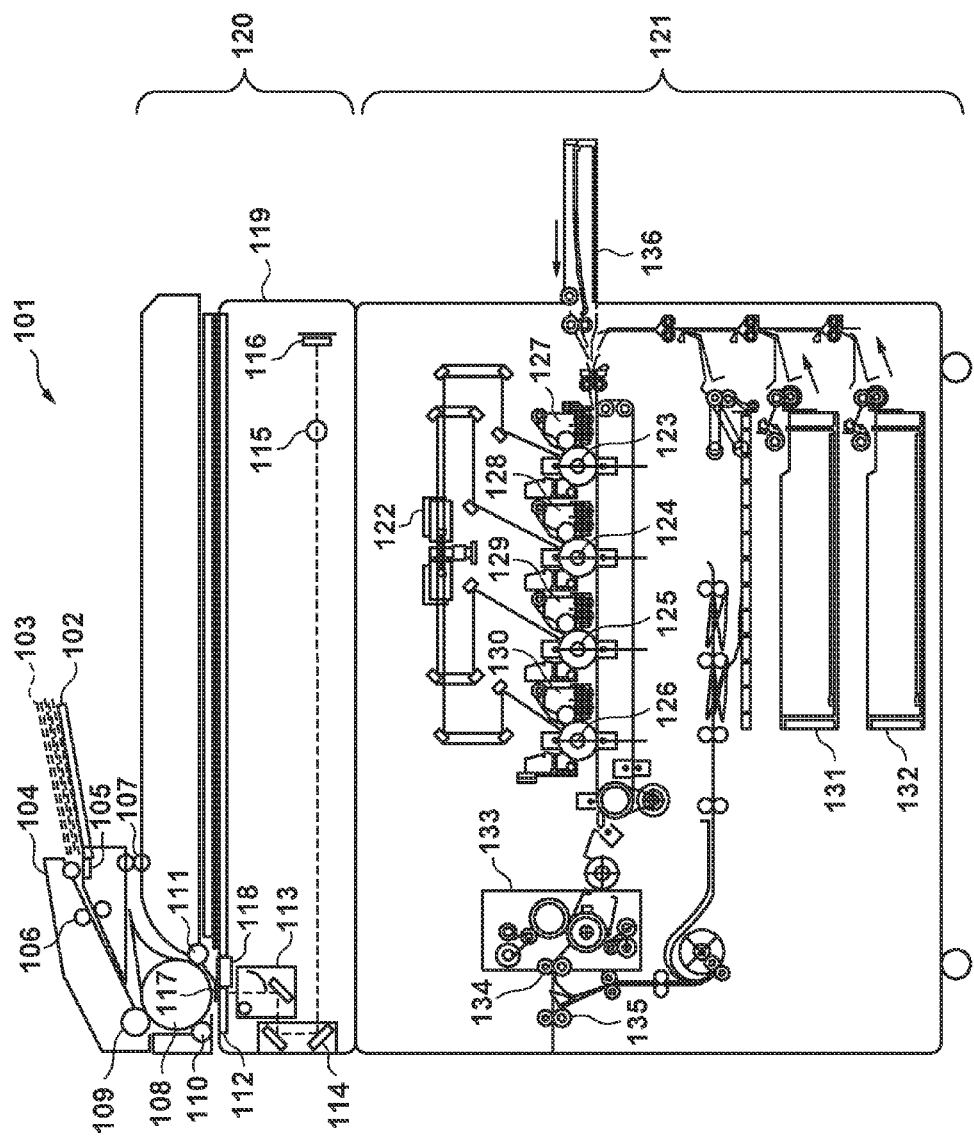
FIG. 1 is a diagram showing a configuration example of a printing apparatus according to one embodiment.

Embodiments of the present invention will now be described in detail with reference to the drawings. Note that the relative arrangement of the components, the numerical expressions and numerical values set forth in these embodiments do not limit the scope of the present invention unless it is specifically stated otherwise.

<Configuration of Printing Apparatus>

Hereinafter, one embodiment of the present invention will be described using drawings. First, the configuration of a printing apparatus 101 in the present embodiment will be described with reference to FIG. 1 and FIG. 6. The printing apparatus 101 in the present embodiment is a multifunction peripheral provided with a scanner 120 and a printer 121. Note that the printing apparatus 101 is not limited to a multifunction peripheral, but can be a printer having only a printing function.

The scanner 120 is provided with an original tray 102, an original supplying roller 104, a separation pad 105, an intermediate roller pair 106, an original discharging roller pair 107, a large roller 108, a first driven roller 109 and a second driven roller 110. The scanner 120 is also provided with a third driven roller 111, an original skimming glass 112, an exposure unit 113, a mirror unit 114, a lens 115, a CCD sensor unit 116, an original guide plate 117, a jump stand 118 and an original reading apparatus 119. The printer 121 is provided with a laser unit 122, photoreceptor drums 123, 124, 125, and 126, developing units 127, 128, 129, and 130, cassette stages 131 and 132, a fixing device 133, conveying rollers 134 and 135 and a manual feed tray 136.

Figure 6:
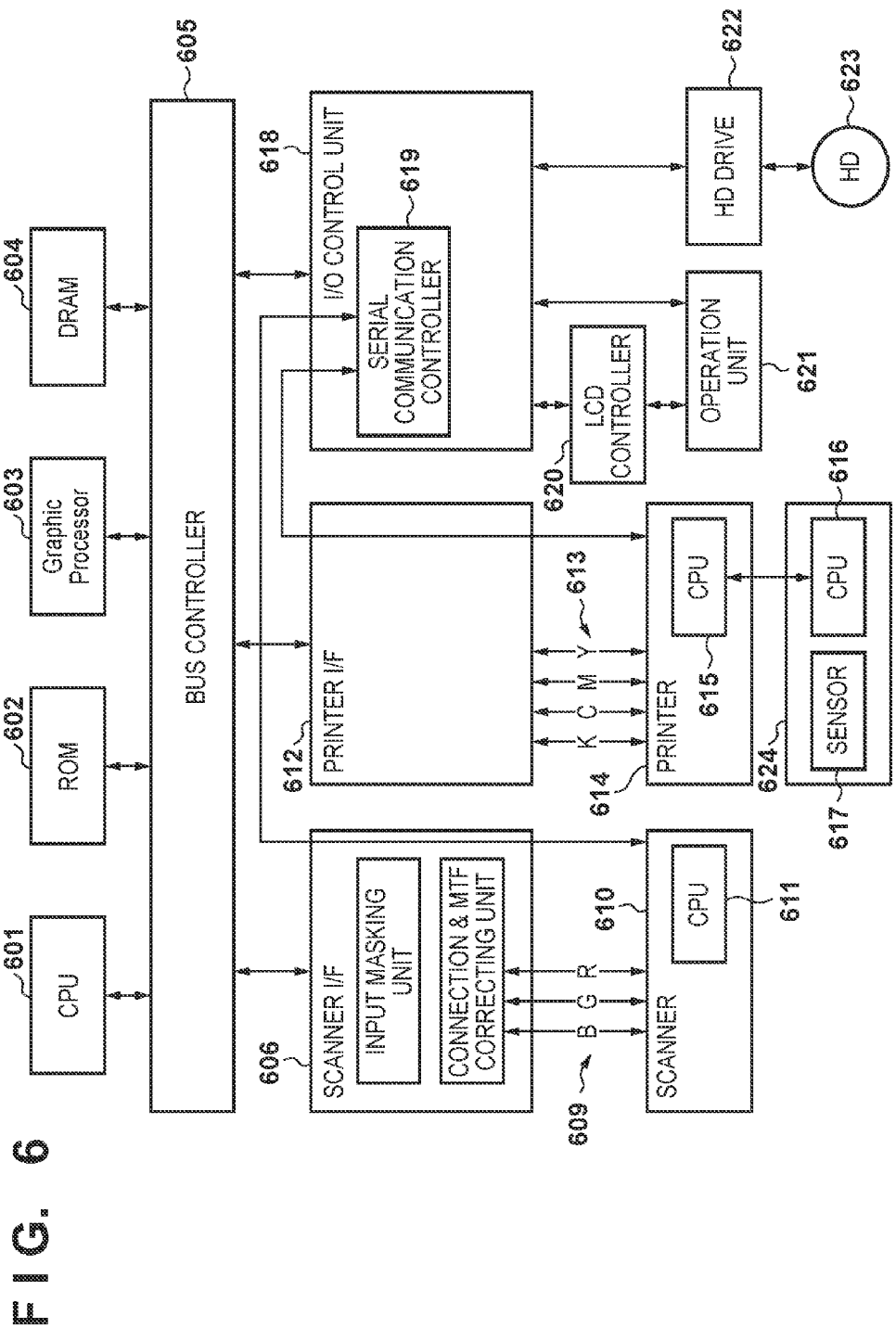
FIG. 6 is a block diagram showing a control configuration of a printing apparatus according to one embodiment.

FIG. 6 shows a control configuration related to image data processing or image processing in the printing apparatus 101 according to the present embodiment. The printing apparatus 101 is mainly controlled by a CPU 601. The CPU 601 operates in accordance with control programs or initial programs stored in a ROM 602, or in accordance with control programs loaded in a DRAM 604 via an HD drive 622 and an I/O control unit 618 from an HD 623. For example, the CPU 601 integrally controls respective components shown in FIG. 1.

Here, an image reading operation performed by the scanner 120 and an image printing operation performed by the printer 121 in the printing apparatus 101 will be described with reference to FIG. 1 and FIG. 6.

In FIG. 1, an image on an original 103 is read while the original 103 is moved relative to the exposure unit 113 of the original reading apparatus 119. The original 103 is set on the original tray 102. The original supplying roller 104 and the separation pad 105 operate as a pair so as to convey the original 103 one sheet at a time. The conveyed original 103 is sent into the apparatus by the intermediate roller pair 106, conveyed by the large roller 108 and the first driven roller 109, and further conveyed by the large roller 108 and the second driven roller 110. The original 103 conveyed by the large roller 108 and the second driven roller 110 passes between the original skimming glass 112 and the original guide plate 117, travels via the jump stand 118, and is conveyed by the large roller 108 and the third driven roller 111. The original 103 conveyed by the large roller 108 and the third driven roller 111 is discharged to the outside of the apparatus by the original discharging roller pair 107. Note that between the original skimming glass 112 and the original guide plate 117, the original 103 is conveyed in a state where the original is brought in contact the skimming glass 112 by the original guide plate 117.

When the original 103 passes over the original skimming glass 112, the surface of the original 103 contacting the original skimming glass 112 is exposed by the exposure unit 113. Resultant reflection light from the original 103 is transmitted to the mirror unit 114. The transmitted reflection light is collected after passing through the lens 115 and is converted into an electrical signal in the CCD sensor unit 116.

The image data of the original converted into the above electrical signal is converted into an RGB signal under the control of the CPU 611. Then the converted image data is temporally stored in the DRAM 604 via a scanner I/F 606 and a bus controller 605 under the control of the CPU 601.

The image data is then saved in the HD 623 via the I/O controlling unit 618 and the HD drive 622.

In the case where the image data saved in the HD 623 is printed, the CPU 601 reads out the image data saved in the HD 623 and temporally save the image data in the DRAM 604. The CPU 601 then executes color space conversion such as conversion from RGB to CMYK via a graphics processor 603, and then transfers the processed image data to a printer 614 via a printer I/F 612.

The image data transferred to the printer 614 is converted from image data to laser light by the laser unit 122 of FIG. 1, and the laser light emitted from the laser unit 122 is formed as images on photoreceptor drums 123, 124, 125, 126. The formed images are fixed to supplied paper (sheet) by the fixing device 133 via developing units 127, 128, 129, 130 that attract toner due to the electrostatic capacitance of the images formed on the photoreceptor drums 123, 124, 125, 126. Note that paper is supplied from the cassette stage 131 and the cassette stage 132. The paper is thereafter discharged by the conveying rollers 134 and 135 to a finisher shown in FIG. 2 that is outside of the apparatus or connected to the apparatus.

Finisher

Figure 2:
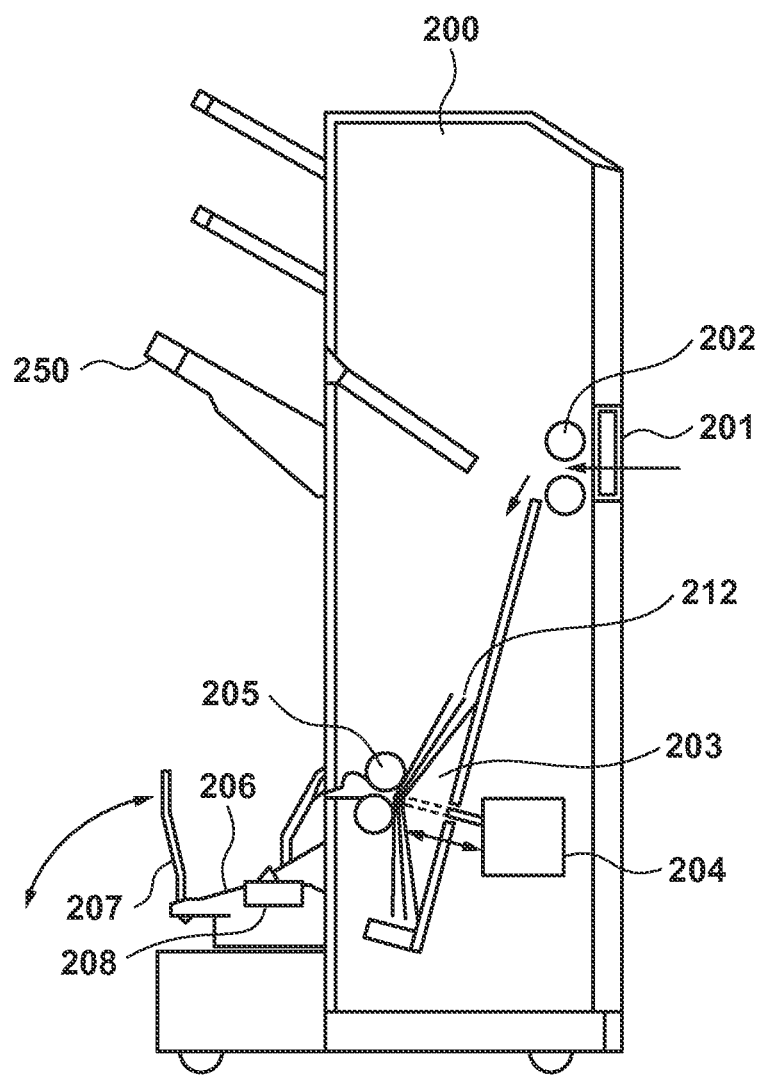
FIG. 2 is a diagram showing an appearance of a finisher according to one embodiment.

Next, the configuration of a finisher 200 that is one example of a sheet processing apparatus will be described with reference to FIG. 2. The finisher 200 is provided with a guiding roller 202, a roller pair 205, a stack tray 203, a middle folding mechanism 204, a saddle tray 206, a stopper 207 and a stack sensor unit 208. Paper discharged from the printer 121 is loaded in the finisher 200 via a portion 201. The finisher can execute bookbinding processing on the loaded paper.

Paper printed by a printer body of FIG. 1 is conveyed into the finisher 200 by the paper discharging roller 135 and the guiding roller 202. The conveyed paper is stacked on the stack tray 203. In the case where saddle stitching is set for the stacked paper, stitching processing is performed on the middle of the paper using a saddle stitching mechanism (not illustrated). The paper is then folded in half using the middle folding mechanism 204 and the rollers 205, and is output as a bookbinding product (a bookbinding article) to the saddle tray 206. The saddle tray 206 is provided with the stopper 207 for preventing the output bookbinding product from falling out of the saddle tray 206 and with the stack sensor unit 208 for determining whether or not there are sheets of a bookbinding product or the like on the saddle tray 206.

Figure 4:
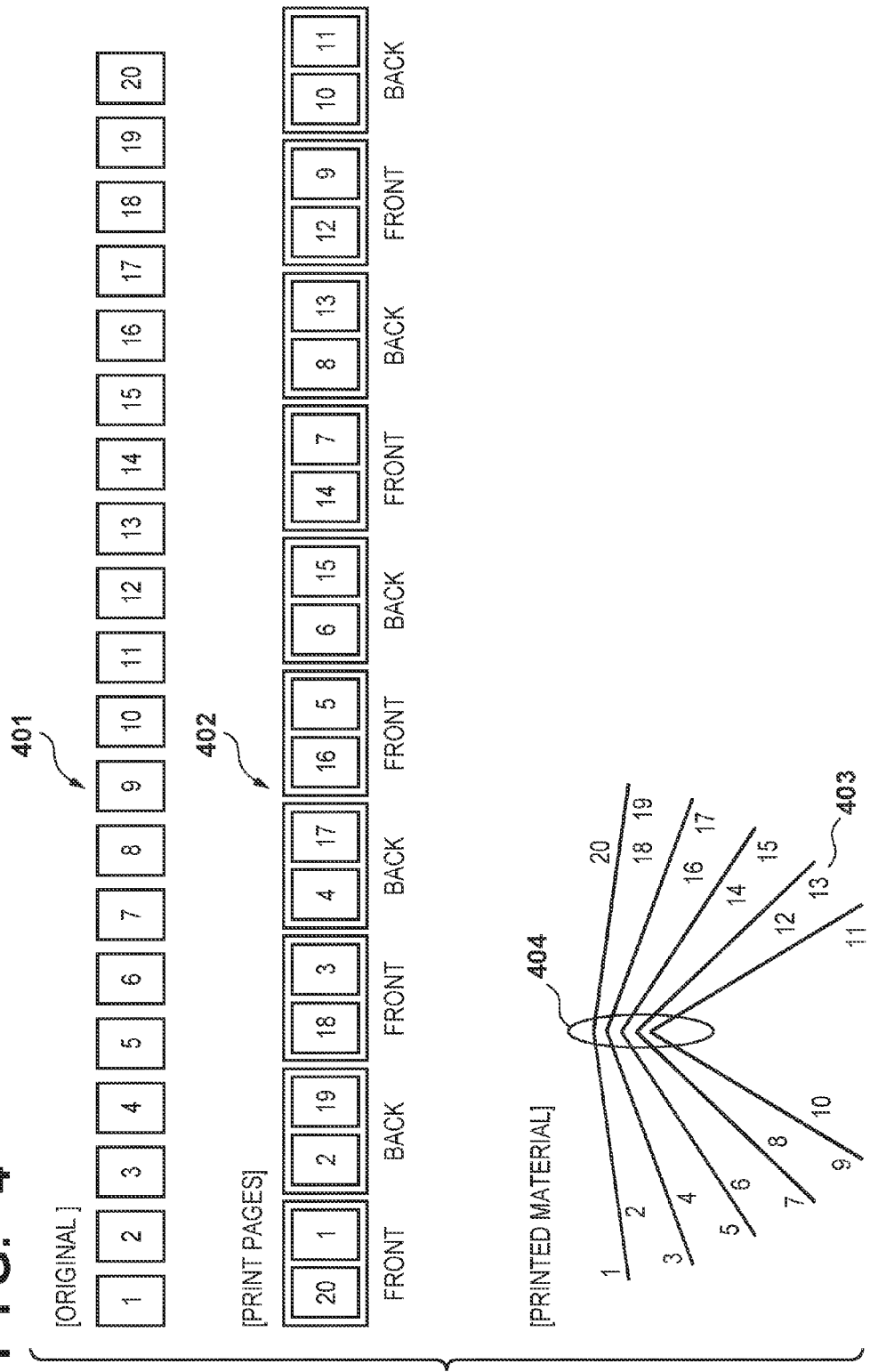
FIG. 4 is a conceptual diagram of bookbind printing according to one embodiment.

In the case of performing bookbinding printing using such a finisher 200, the printing apparatus 101 lays out the image data (read pages) of an original 401 on paper like print pages 402 shown in FIG. 4 and performs printing. Using the stopper 207 prevents bookbinding products from falling out. However, the presence of the stopper 207 limits the amount of bookbinding products that can be stacked on the saddle tray 206. Accordingly, when a predetermined number of sheets (of paper) are stacked in a state where the stack sensor unit 208 is detecting sheets on the saddle tray 206, the printing apparatus 101 performs control so as to stop stacking of bookbinding products by stopping printing.

As a method of easing such limitation, in the present embodiment, a limitless mode is provided for ensuring that output bookbinding products are discharged to a storage unit disposed outside the saddle tray 206 by lowering the stopper 207 of the saddle tray 206. The stopper 207 is kept in a state such as in FIG. 2 in a normal mode, but can be moved in the direction of an arrow in FIG. 2 by a user operation. In the limitless mode, the user lowers the stopper 207. Further, a box for accommodating bookbinding products is placed under the saddle tray 206 so that bookbinding products that fall out of the saddle tray 206 are not scattered about. Further, in this limitless mode, the printing apparatus 101 can output a large amount of bookbinding products into the box by deactivating the stack sensor unit 208. Moreover, the necessity of removing bookbinding products from the saddle tray 206 many times before printing is completed is eliminated, saving the user's time and effort.

Figure 5:
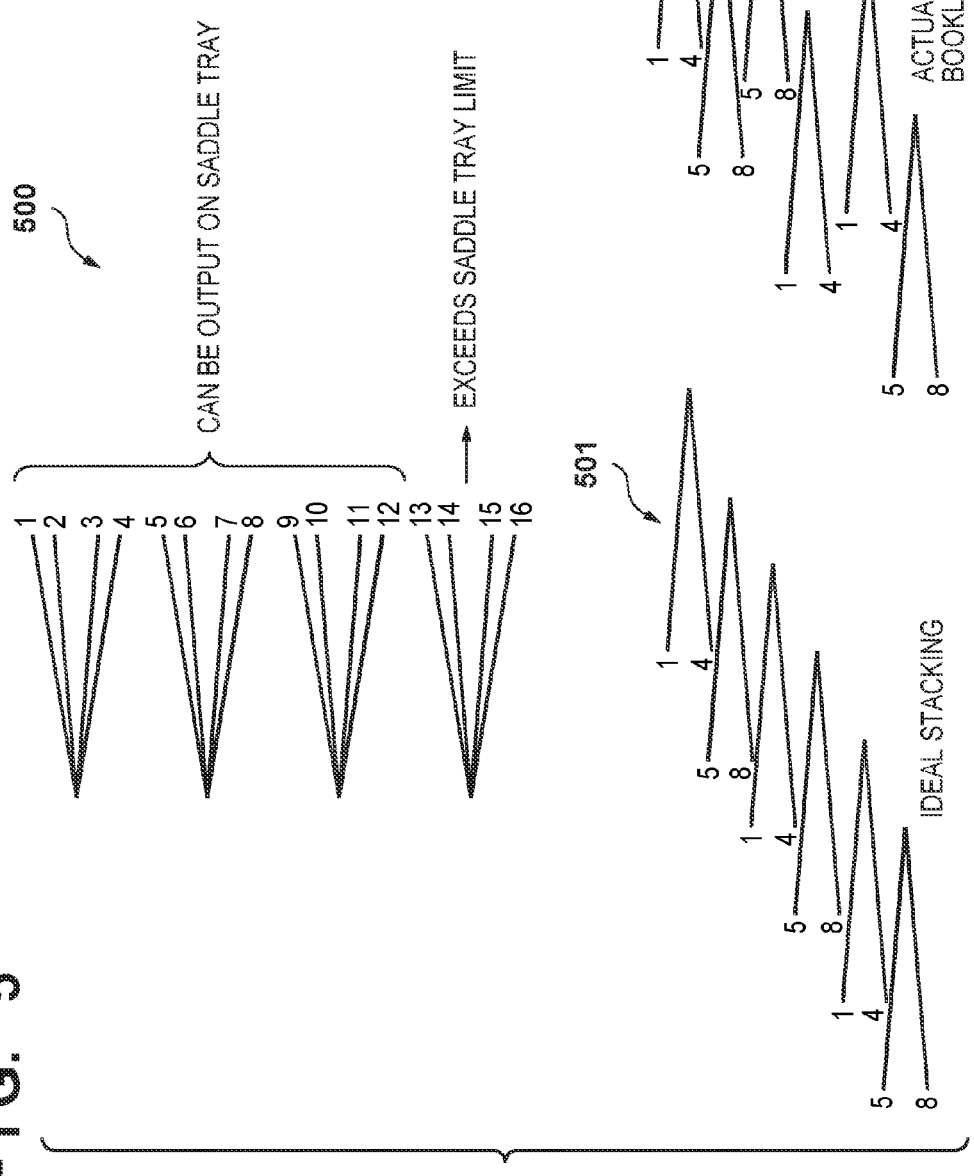
FIG. 5 is a diagram showing discharged paper according to one embodiment.

As a method of bookbinding, there is also a division bookbinding function for dividing one bookbinding product into multiple bundles (booklets) and performing bookbinding. In the case of performing division bookbinding, if there are a large number of booklets (the division number is large) because of there being a large number of pages to be printed, the saddle tray 206 will not be able to hold the whole bookbinding product. As shown by a printed product 500 in FIG. 5, a user (operator) is thus required to remove the bookbinding product on the saddle tray 206 before printing is completed. The limitless mode in which printing is not stopped due to the limitation on the stacked amount on the saddle tray 206 is also available in the case of performing division bookbinding. However, in the case of performing division bookbinding in which multiple copies are involved, applying the limitless mode causes the divided booklets to be mixed up in a disordered manner in the box. Accordingly, workloads when the user rearranges the booklets in a correct order after printing ends increase. Specifically, reference numeral 501 in FIG. 5 represents a schematic diagram of an ideal stacking order of the booklets. If bookbinding products are stacked in such manner as indicated by reference numeral 501 in the first place, the user is not required to rearrange the bookbinding products, but because of (the presence of) the difference in height from the saddle tray 206 to the box, multiple bookbinding products that are accommodated in the box are stacked in the wrong page order as shown by reference numeral 502. The user is thus required to rearrange the bookbinding products while checking the page numbers and contents of images included in the respective booklets to ensure the sequence is not wrong, thus increasing the user's time and effort. Note that reference numerals 501 and 502 in FIG. 5 indicate only the outermost sheets of respective booklets included in the printed products 500 for convenience of explanation. Further, description is given using only booklets consisting of pages 1-4 and booklets consisting of pages 5-8 of printed products 500, and illustration of booklets consisting of pages 9-12 and booklets consisting of pages 13-16 is omitted.

<Operation Unit>

Figure 8:
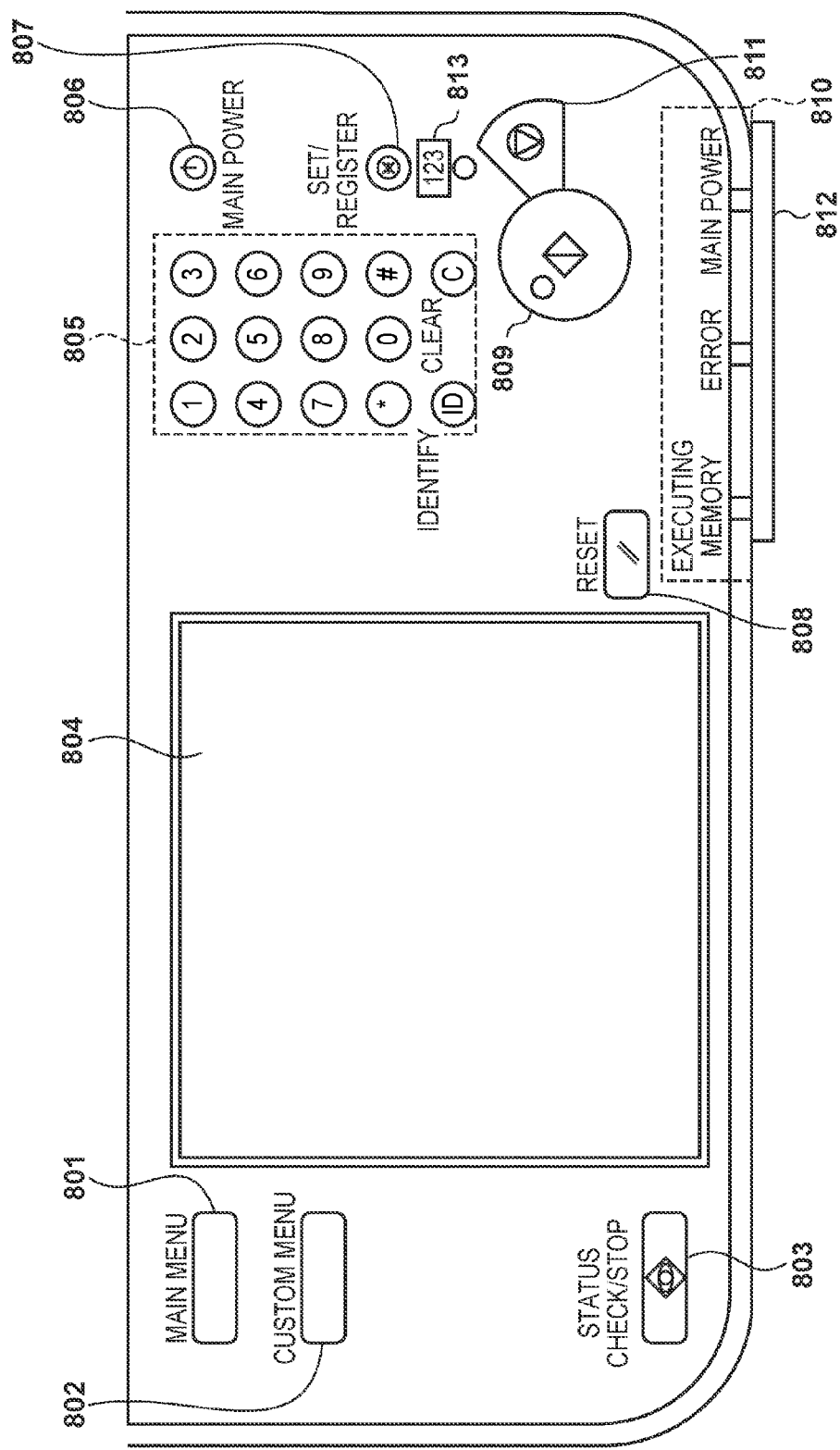
FIG. 8 is a diagram showing an appearance of an operation unit according to one embodiment.

Next, an operation unit 621 and examples of screens displayed on the operation unit 621 will be described with reference to FIG. 8, FIG. 10A, FIG. 10B, FIG. 11A and FIG. 11B. FIG. 8 shows the appearance of the operation unit. The operation unit 621 is provided with a main menu key 801, a custom menu key 802, a status check/stop key 803, an LCD panel 804, a numeric keypad 805, a power key 806, a user setting key 807 and a reset key 808. The operation unit 621 is also provided with a start key 809, an LED 810, a stop key 811, an authentication card slot 812 and a counter display key 813.

On the LCD panel 804, a copy screen denoted by reference numeral 1000 in FIG. 10A is displayed. The copy screen 1000 includes setting buttons 1001-1007 for configuring/performing various types of settings. For example when an OTHER FUNCTIONS button 1006 is pressed, the operation unit 621 sends a notification to/notifies the CPU 601 via the I/O controlling unit 618. The CPU 601 causes the LCD panel 804 of the operation unit 621 to display a screen 1100 of FIG. 11A in accordance with a program expanded in the DRAM 604 from the ROM 602 or the HD 623.

Figure 11B:
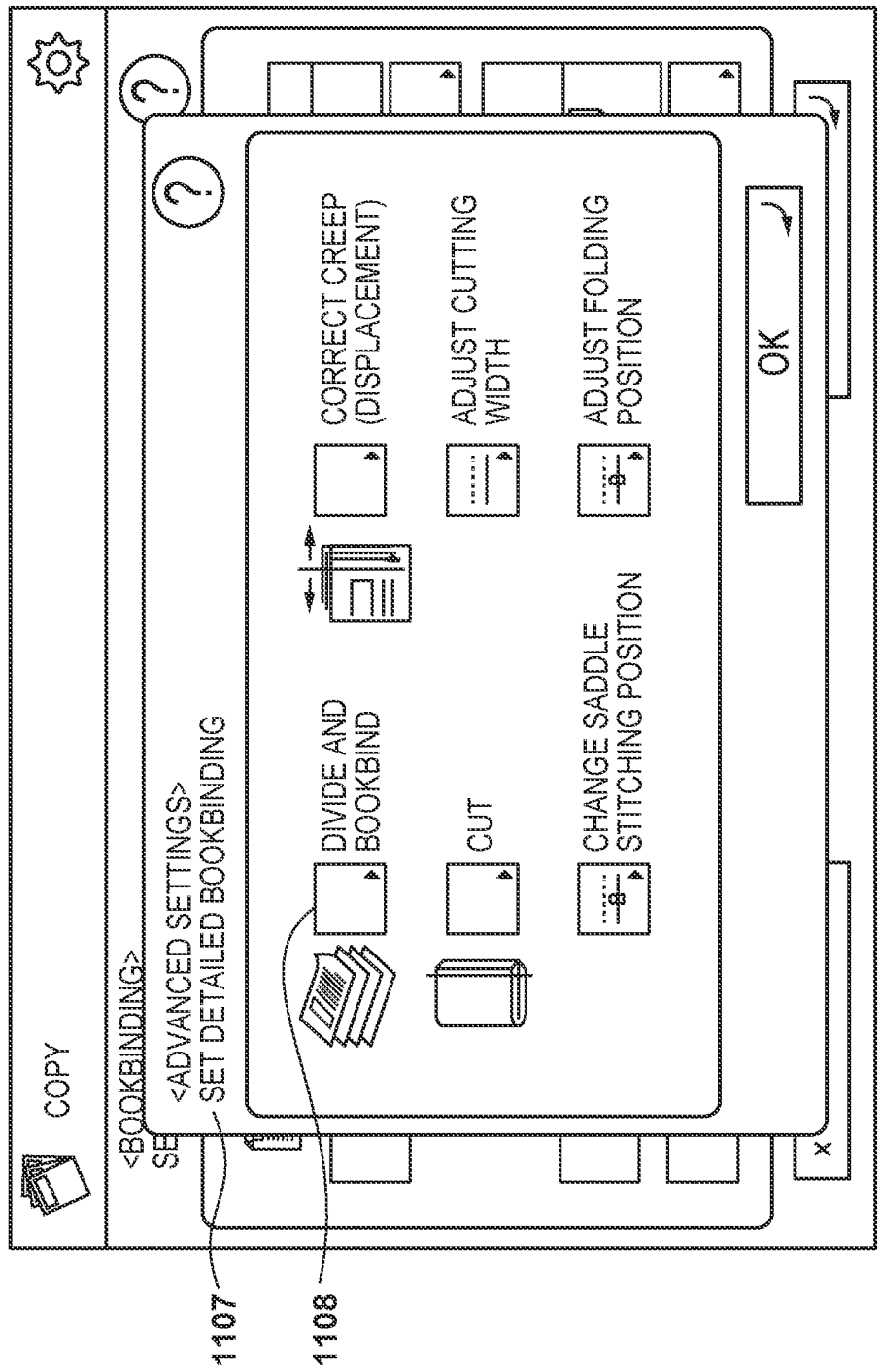

The screen 1100 includes buttons 1101, 1102, 1103, 1104, 1105, 1109, and 1106 related to bookbinding copy. Buttons 1101 and 1102 are for setting a layout of images to be printed. An ALLOCATE button 1101 is a button for setting to print images of the original denoted by reference numeral 401 in FIG. 4 after rearranging the print pages in a bookbinding page order such as is denoted by reference numeral 402 in FIG. 4. A ALLOCATE OFF button is a button for setting to print images of the original denoted by reference numeral 401 in FIG. 4 in an unchanged page order. A button 1109 is for setting whether the original to be scanned is a one-sided original or a double-sided original. Buttons 1103, 1104 and 1105 are for setting the type of post processing to be performed on the sheets. A FOLD+SADDLE STITCH button 1103 is a button for setting saddle stitching binding in which the sheets are stitched along the middle and folded at the middle. A DO NOT FOLD/FOLD OFF button 1104 is a button for setting to output sheets without being folded. In the case where the sheets are not folded, an output destination of the sheets is set to a normal paper discharging tray 250 shown in an upper part of FIG. 2, rather than to the saddle tray 206. A FOLD ONLY button 1105 is a button for setting to execute middle folding bookbinding in which only the sheets are only folded and do not undergo stitching processing. When the button 1106 of the screen 1100 is pressed (down), a screen 1107 of FIG. 11B is displayed on the operation unit 621. By the button 1108 or the like of the screen 1107 being pressed (down), the settings thereof are notified to the CPU 601 via the operation unit 621 and the I/O controlling unit 618. The CPU 601 saves the notified settings in the DRAM 604.

FIG. 9 shows a data structure of settings that are saved in the DRAM 604. The data structure broadly includes an initial setting saving area 900, a function setting saving area 910, and an output setting saving area 920. In the initial setting saving area 900, the information of a limitless mode 901 and the information of an output limit number 902 are saved. The information of the limitless mode 901 indicates whether the limitless mode (stack limiting mode) is activated or deactivated. The information of the output limit number 902 indicates the number of sheets (of paper) that can be stacked on the saddle tray 206. In the function setting saving area 910, the information of the function mode 911, the information of double-sided printing 912, the information of the number of copies 913, and information of division number 914 are saved. The information of the function mode 911 indicates the type/kind of post processing set by the user. The information of the double-sided printing 912 indicate whether double-sided printing (is set to be executed) or one-sided printing is set to be executed by a user. The information of the number of copies 913 indicates the number of copies to be printed set by a user via the operation unit 621. The information of the division number 914 indicates the number of sheets (of paper) included in one booklet in the case of executing division bookbinding. In the output setting saving area 920, the information of a sort mode 921, folding processing 922 and stapling processing 923 is saved. The information of the sort mode 921 indicates a sort mode such as group-division bookbinding printing described below. The information of the folding processing 922 indicates whether or not execution of folding processing has been set by a user. The information of the stapling processing 923 indicates whether or not execution of binding processing has been set by a user.

<Outputting Processing>

Next, outputting processing related to settings for bookbinding printing and the operation of the finisher 200 will be described in detail with reference to FIGS. 7A and 7B. Bookbinding printing is set on a screen in which the CPU 601 performs display via the I/O controlling unit 618, an LCD controller 620, and the operation unit 621. Note that processing described below is realized by the CPU 601 reading out control programs stored in the ROM 602 or the like into the DRAM 604 and executing the programs.

In S701, the CPU 601 accepts the settings of copy mode from a user via a screen displayed on the operation unit 621. The CPU 601 then saves the accepted settings in the function mode 911, the double-sided printing 912, the number of copies 913, the division number 914, the sort mode 921, the folding processing 922 and the stapling processing 923. The following description will be given assuming that the button 1101 of the screen 1100 in FIG. 11A has been pressed (down) by a user and information indicating that bookbinding printing is to be executed is set in the function mode 911. Also, description will be given assuming that the button 1103 has been pressed down by a user, information indicating that folding processing is to be executed is set in the folding processing 922 and information indicating that middle binding processing is to be executed is set in the stapling processing 923.

In S702, the CPU 601 detects that the start key 809 is pressed by a user after settings were made via the operation unit 621. In S703, the CPU 601 performs original reading with the original reading apparatus 119 described above in accordance with the settings saved in the double-sided printing 912, and saves image data in the HD 623 via the DRAM 604 for each page read from an original. Furthermore, in S704, the CPU 601 calculates the number of sheets (of paper) to be bound (into a book) from the image data stored in the HD 623. The number of sheets (of paper) to be bound (into a book)=the number of read pages/4+the number of read pages % 4. Note that the number of read pages/4 represents the quotient when the number of read pages is divided by four, and the number of read pages % 4 represents the remainder when the number of read pages is divided by four. The CPU 601 calculate the number of sheets (of paper) to be bound (into a book) (the number of sheets (of paper) to be printed) using the above expression. Here, the number of read pages is the number of pages read from the original using the original reading apparatus 119, which is the number of pages to be bound (into a book). Note that, because it is possible to allocate at most four pages on one sheet (of paper) in the case of bookbinding printing, the above-described calculating method is given.

Next, in S705, the CPU 601 determines the number of sheets (of paper) processable by the saddle processing, which is obtained from the calculated number of sheets of paper to be bound (into a book), the number of sheets of paper that can be stacked on the stack tray 203 of the finisher 200, and the number of sheets of paper that can be folded by the middle folding mechanism 204 and the rollers 205. If the number of sheets of paper processable by the saddle processing is exceeded, the operation moves on to S706, and if not, the operation moves on to S717.

In S706, the CPU 601 calculates a total sheet output number from the number of booklets and the number of copies. A method for calculating the number of booklets uses "the number of sheets of paper to be bound (into a book)". The number of booklets=(the number of sheets of paper to be bound into a book+(the number of sheets (of paper) processable by the saddle processing−the number of sheets (of paper) to be bound (into a book) % the number of sheets (of paper) processable by the saddle processing))/the number of sheets of paper processable by the saddle processing. Here, booklets refer to multiple paper groups which are resulted by dividing one book as shown in FIG. 5, and the number of the booklets is calculated by the above expression.

Furthermore, the CPU 601 uses the number of booklets calculated by the above expression to calculate the total sheet output number. The total sheet output number=the number of booklets×the number of sheets of paper processable by the saddle processing×the number of copies. Here, as the number of copies in the above expression, the information stored in number of copies 913 is used.

Next, in S707, the CPU 601 compares the calculated total sheet output number to the number of sheets (of paper) stackable on the saddle tray 206 of the finisher 200. Here, in the case where the total sheet output number is larger than the number of sheets (of paper) stackable on the saddle tray 206, the operation moves on to S708, and otherwise the operation moves on toS716. In S708, the CPU 601 obtains the limitless mode 901 and the output limit number 902 of the initial setting saving area 900 stored in the DRAM 604, and performs determination of the limitless mode (stack limiting mode) in S709. In the case where the limitless mode is automatically set, the operation moves on to S710, in the case where the limitless mode is ON (activated), the operation moves on to S715, and in the case where limitless mode is OFF (deactivated), the operation moves on to S716.

The limitless mode 901 and the output limit number 902 are set using a user mode setting screen 1200 shown in FIG. 12, which is displayed on the LCD panel 804 by the control of the CPU 601 that received a notification via the I/O controlling unit 618 upon the user setting key 807 being operated. The user mode setting screen 1200 includes a paper discharging tray limitless mode 1201 and an output limit number of paper discharging tray 1202 as setting buttons, and operating these buttons causes respective pop-up screens or the like to be displayed on which setting values can be input. Specifically, the paper discharging tray limitless mode 1201 has options of "0:OFF", "1:ON" and "255: AUTO", and any of these options can be set. The numerical value of the output limit number of the paper discharge tray can be input using the numeric keypad 805 of the operation unit 621, for example.

In the case where the limitless mode 901 is "0:OFF", the operation moves on to S716, and the CPU 601 performs a printing operation without any change. In the case where limitless mode 901 is "1:ON", the operation moves on to S715, and the CPU 601 displays the limitless preparation display 1009 of FIG. 10B on the LCD panel 804 via the I/O controlling unit 618, the LCD controller 620 and the operation unit 621. A user (operator) can make a mode shift to the limitless mode by lowering (releasing) the stopper (limiting means) 207 of the finisher 200 in accordance with an instruction on this display.

Figure 3:
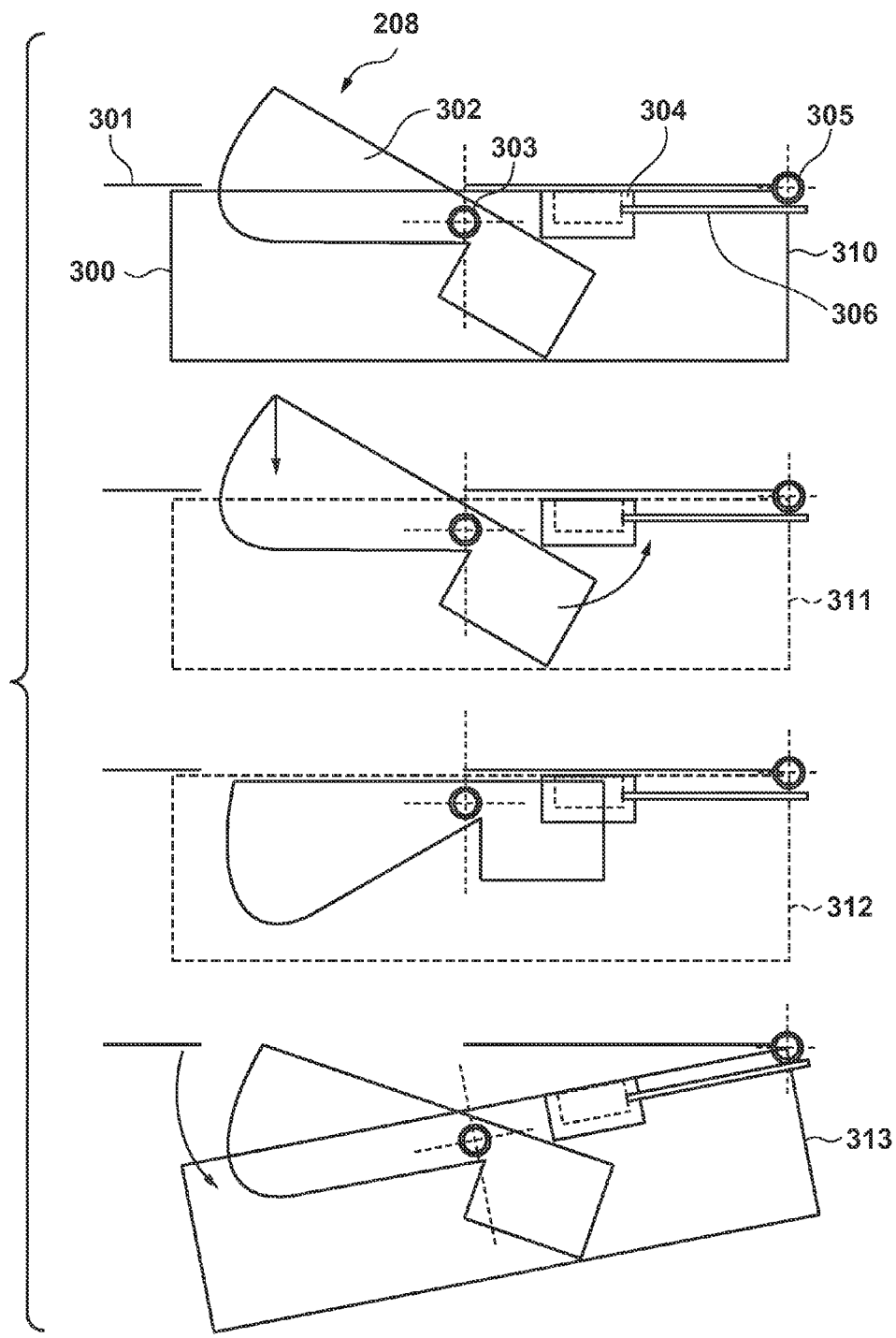
FIG. 3 is a diagram showing an appearance of a stack sensor according to one embodiment.

In the case where the finisher 200 is shifted to the limitless mode, the stack sensor unit 208 operates so as to not detect stacking of sheets. Here, the configuration and operations of the stack sensor unit will be described with reference to FIG. 3.

Reference numeral 310 indicates the detailed configuration of the stack sensor unit 208. In the stack sensor unit 208, a flag 302, a flagpole 303, a transmission sensor 304, and a transmission sensor signal line 306 are housed inside of a unit casing 300. The unit casing 300 is installed on the saddle tray 206 of the finisher 200 using a casing connection hinge 305. Further, the stopper 207 is configured to support the unit casing 300. The flag 302 is configured to rotate about the flagpole 303, and mounted with one end protruding from a flag window 301 opened on the saddle tray 206.

When sheets are output to the saddle tray 206 of the finisher 200, the flag 302 rotates about the flagpole 303 as shown by reference numeral 311 and assumes an arrangement in which one end of the flag 302 in the direction opposite the flag window 301 blocks the transmission sensor 304 as shown by reference numeral 312. The transmission sensor 304 is thus turned ON, which is notified to the CPU 616 of a finisher 624 in FIG. 6 via the transmission sensor signal line 306. The CPU 616 notifies the CPU 601 via the CPU 615 of the printer 614 and the serial communication controller 619 of the I/O controlling unit 618. Accordingly, the CPU 601 can detect the presence of sheets on the saddle tray 206 of the finisher 200.

As shown by 312, when a user lowers down the stopper 207, the unit casing 300 tilts with respect to the casing connection hinge 305 as shown by reference numeral 313. At this time, because the flag 302 moves away from the flag window 301, the flag 302 does not rotate even if sheets are stacked on the saddle tray 206, whereby the transmission sensor 304 is not turned ON and does not detect paper on the saddle tray 206.

The description will now return to FIGS. 7A and 7B. When the user lowers the stopper 207 and presses (down) an OK button 1008 in S715, the operation moves on to S716, and the CPU 601 starts printing processing. On the other hand, in the case where the limitless mode 901 is "255: AUTO", the operation moves on to S710, and the CPU 601 changes the sort mode 921 of the output setting saving area 920 saved in DRAM 604 to group-division bookbinding printing. Group-division bookbinding printing is performed so as to print the designated number of copies of each booklet. For example, outputting of four copies with division number 3 is a mode in which four copies of the first booklet are output, then four copies of the next booklet are output, and then four copies of the last booklet are output. Specifically, in the case of printing four copies of the printed product 500 shown in FIG. 5, the printing apparatus 101 outputs four copies of a booklet consisting of pages 1-4, and then outputs four copies of a booklet consisting of pages 5-8. The printing apparatus 101 thereafter outputs four copies of a booklet consisting of pages 9-12, and lastly outputs four copies of a booklet consisting of pages 13-16. Accordingly, because the box placed under the saddle tray 206 houses the respective booklets together, it is possible to reduce the time and effort when the user later rearranges the booklets in page order. Note that the printing apparatus 101 may output four copies of the booklet of pages 1-4, then stop printing and display on the operation unit 216 a message for prompting the user to replace the box. Further, in the case where notification that the box has been replaced is received from the user, control can be performed (so as) to output four copies of the next booklet of pages 5-8. Hereinafter, this operation is repeated until printing is completed. Accordingly, because the respective booklets are housed together in each box, it is possible to reduce time and effort when the user later rearranges booklets in page order.

When the sort mode 921 is set to group-division bookbinding printing, the operation moves on to S711, and the CPU 601 displays the limitless preparation display 1007 on the LCD panel 804 similarly to S715. When the user lowers the stopper 207 and presses (down) the OK button 1008, the operation moves on to S712, and the CPU 601 starts group-division bookbinding printing processing. In S713, the CPU 601 determines whether processing of the copies has ended. In the case where there are still copies to be processed, the operation moves on to S714, and otherwise the operation moves on to S1302 in FIG. 13. In S714, the CPU 601 performs output product removal display 1601 of the saddle tray 206 shown in FIG. 16 on the LCD panel 804. When it is detected through the operation unit 621 and the I/O controlling unit 618 that the user has removed the output products and pressed (down) an OK button 1602, the operation returns to S712, and group-division bookbinding printing processing is performed again until there are no remaining copies to be processed.

In the case where, in S705, the number of sheets (of paper) to be bound (into a book) is smaller than the number of sheets (of paper) processable by the saddle processing, the operation moves on to S717, and the CPU 601 calculates a total sheet output number using the value stored in the number of copies 913 of the function setting saving area 910 in the DRAM 604 as follows. The total sheet output number=the number of sheets (of paper) to be bound (into a book)×number of copies=(the number of read pages/4+the number of read pages % 4)×the number of copies. When the total sheet output number is calculated, the CPU 601 executes the processing of S718 to S722. Note that since the processing of S718 to S722 is similar to the processing of S707, S708, S709, S715 and S716, description thereof will be omitted.

Figure 13:
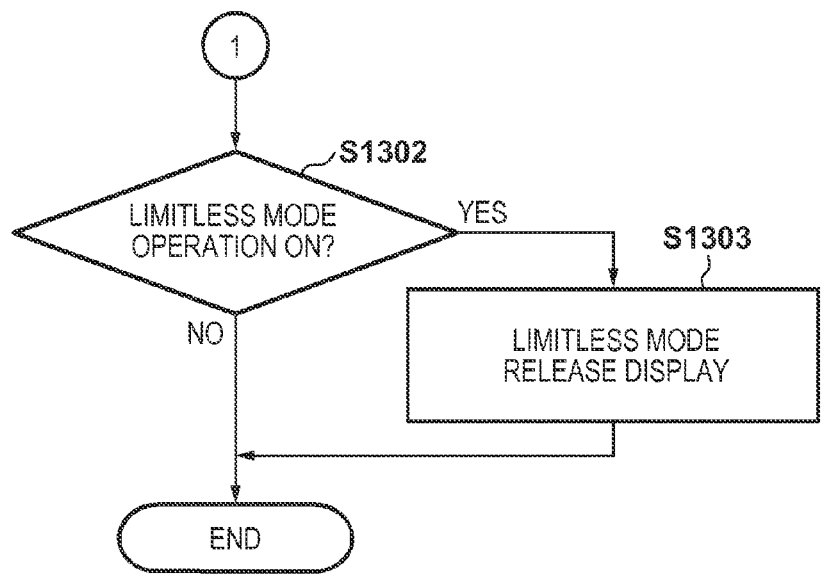
FIG. 13 is a flowchart showing a control procedure after printing ends according to one embodiment.

Subsequently, processing after printing processing will be described with reference to FIG. 13. The processing shown in FIG. 13 indicates an operation after the printing operations 712, 716, and 722 shown in the flowchart in FIGS. 7A and 7B.

Figure 14:
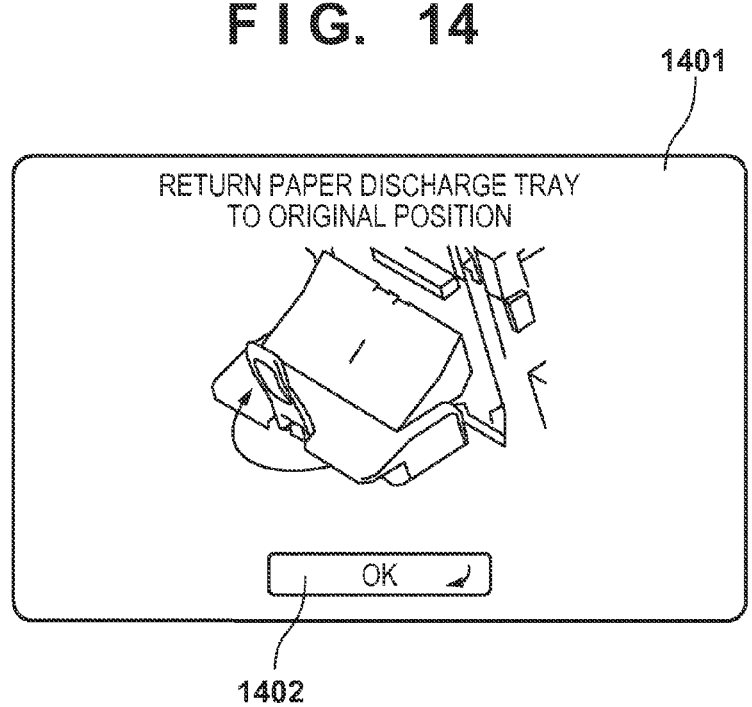
FIG. 14 is a diagram showing a user work instruction screen displayed after printing ends according to one embodiment.

In S1302, the CPU 601 determines whether the value of the limitless mode 901 of DRAM 604 is ON after printing is completed and the limitless mode operation has been performed from the function mode 911 and the sort mode 921. If the limitless operation has been performed, the operation moves on to S1303, otherwise the processing is ended. In S1303, the CPU 601 displays a screen 1401 shown in FIG. 14 on the LCD panel 804 via the I/O controlling unit 618, the LCD controller 620 and the operation unit 621. The screen 1401 is displayed for prompting the user to return the discharging tray to its original state. When an OK button 1402 is operated by the user, processing is ended.

<Printing Processing>

Figure 15:
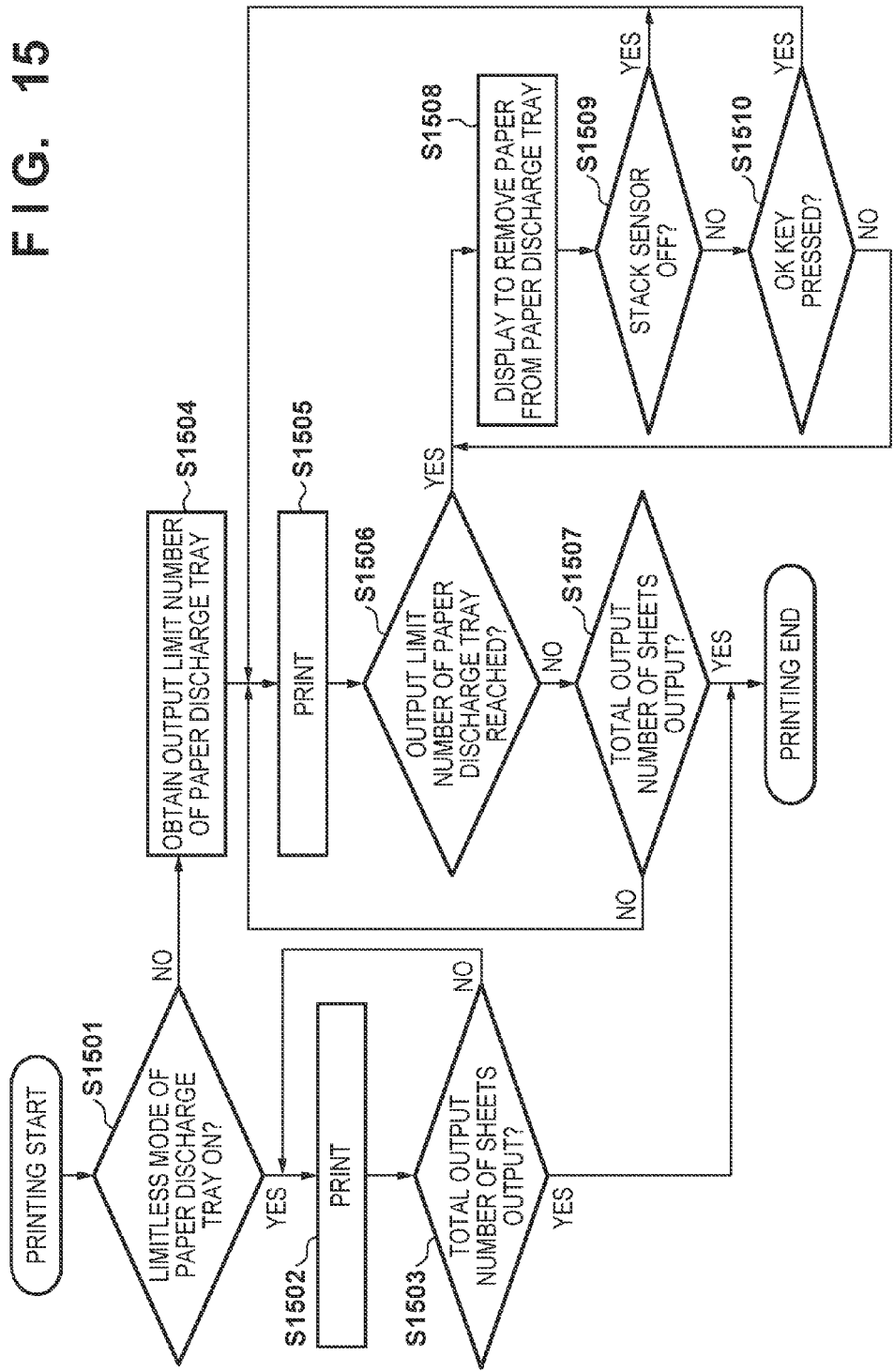
FIG. 15 is a flowchart showing a detailed control procedure of printing processing according to one embodiment.

Next, a detailed controlling procedure of printing processing S716 and S722 in a flowchart of FIG. 7B will be described with reference to FIG. 15. Note that processing described below is realized by the CPU 601 reading out the control programs stored in the ROM 602 or the like into the DRAM 604 and executing the programs.

In S1501, the CPU 601 determines whether or not the value of the limitless mode 901 of the initial setting saving area 900 saved in the DRAM 604 is ON. In the case where the value is ON, the operation moves on to S1502, and in the case where the value is not ON, the operation moves on to S1504. In S1502 and S1503, the CPU 601 performs printing until the total output number of the sheets are output. When printing of the total output number of sheets ends, the processing is ended.

On the other hand, in the case where the value of the limitless mode 901 is OFF, in S1504, the CPU 601 obtains the value of the output limit number 902 of the initial setting saving area 900 saved in the DRAM 604, and performs printing in S1505. Then, in S1506, the CPU 601 counts the number of sheets of printed paper by using a counter inside the DRAM 604, and determines whether or not the number of sheets of printed paper has reached the value of the output limit number 902. In the case where the value has not been reached, in S1507, the CPU 601 determines whether or not the total output number of sheets have been output. If not, the operation returns to S1505, and otherwise the processing is ended.

Figure 16:
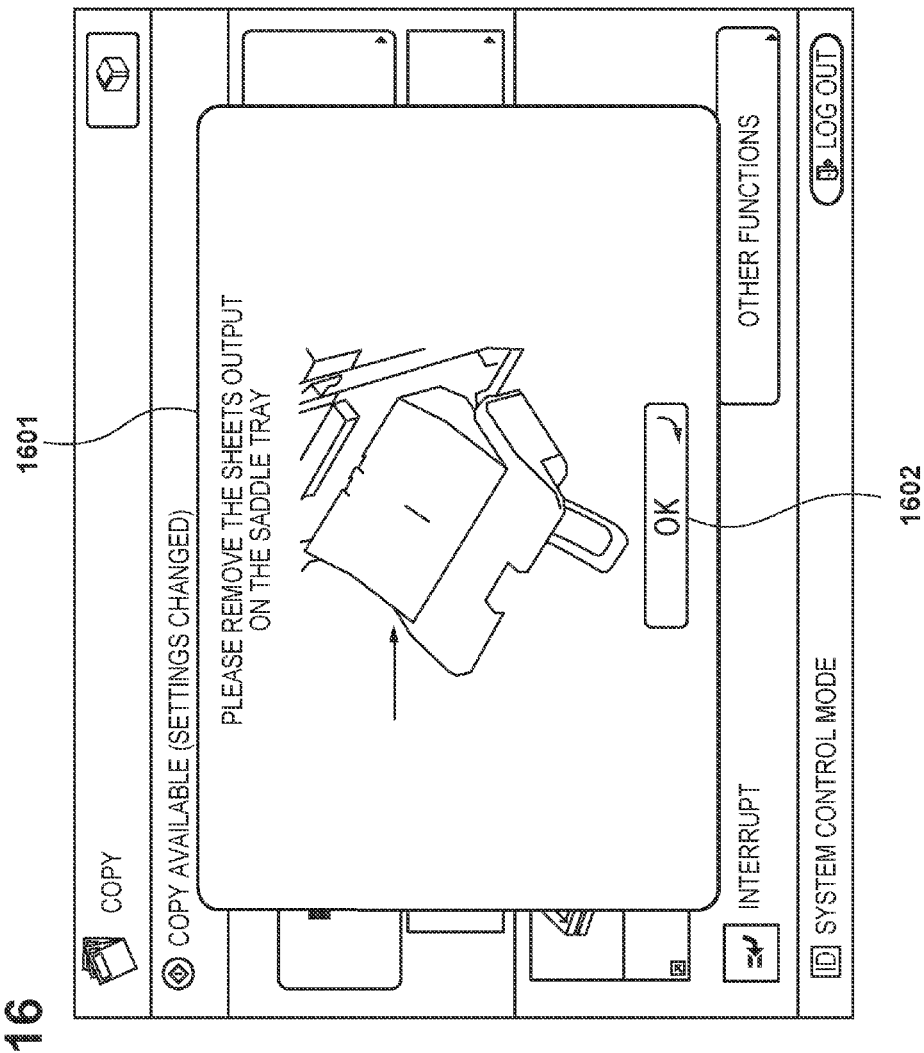
FIG. 16 is a diagram showing a user work instruction screen during printing according to one embodiment.

In the case where the number of sheets (of paper) printed in S1506 has reached the output limit number 902, the operation moves on to S1508, and the CPU 601 displays a screen 1601 of FIG. 16 on the LCD panel 804. Subsequently, in S1509 and S1510, the CPU 601 waits until it is detected that the stack sensor unit 208 of the finisher 200 has been turned OFF or until an OK button 1602 displayed on the LCD panel 804 is pressed (down). When either is detected, the value of the counter in the DRAM 604 is reset and the operation returns to S1505.

As described above, the printing apparatus according to the present embodiment calculates, from the read image data, the number of sheets (of paper) to be printed in the case of performing bookbinding printing, divides a book for bookbinding printing into multiple booklets in the case where the calculated number of sheets (of paper) to be printed is more than the number of sheets (of paper) processable by the finisher, and perform printing. Furthermore, in the case where the number of sheets (of paper) to be printed is more than the number of stackable sheets of the finisher, the present printing apparatus releases the stopper 207 of the finisher 200 in accordance with the processing mode and discharges the paper. Alternatively, the required number of copies for each of multiple booklets are printed consecutively and stacked on a stacking unit. Accordingly, in accordance with the present embodiment, the number of sheets (of paper) of the book and the number of copies are calculated from the number of print pages when performing post processing. Then, by switching the output method based on the number of copies, the number of stackable sheets of the post-processing apparatus and the like, it is possible to execute large amounts of bookbinding printing and middle folding printing while reducing the user's time and effort.

Other Embodiments

Note that, in the embodiment described above, an example in which a user sets ON/OFF of the limitless mode on a screen shown in FIG. 12 was described. However, the present invention is not limited thereto. For example, a sensor for detecting whether or not the stopper 207 has been lowered may be provided such that the limitless mode is set to ON or Auto in association with detection that the stopper 207 has been lowered. In this case, it is desirable that the limitless mode is set to OFF in association with detection that the stopper 207 has been raised.

Note that in the above described embodiment, an example of a case of a copy job was described. However, the present invention can be applied to a print job in which the printing apparatus 101 executes printing based on image data and print settings received from an external PC via a network. Note that in this case, it is desirable that the screens shown in FIG. 10A, FIG. 10B, FIG. 11A and FIG. 11B are displayed on the display unit of the external PC and settings are accepted via an operation unit of the external PC.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157045 filed on Jul. 31, 2014, which is hereby incorporated by reference herein in its entirety.

What is claimed is:

1. A printing apparatus comprising:
a printer configured to print images on sheets;
a sheet processor configured to execute bookbinding processing on the printed sheets on which images have been printed by the printer;
a stacker, on which processed sheets, resulting from the bookbinding processing having been executed on the printed sheets by the sheet processor, are stacked;
a movable stopper configured to prevent dropping of the processed sheets stacked on the stacker;
a controller configured to:
(i) set, based on a user instruction, a first mode or a second mode,
(ii) stop a print operation of the printer based on an amount of stacked sheets on the stacker and restart the print operation when the stacked sheets are removed from the stacker, in a case where a mode of the printing apparatus is set to the first mode, and
(iii) continue the print operation regardless of the amount of stacked sheets on the stacker in a case where the mode of the printing apparatus is set to the second mode; and
a display unit configured to display a message for prompting a user to lower the movable stopper in a case where the mode of the printing apparatus is set to the second mode.

2. The printing apparatus according to claim 1, wherein a sheet stacking surface of the stacker is tilted, and
wherein the movable stopper prevents the stacked sheets on the sheet stacking surface of the stacker from dropping by a self-weight of the stacked sheets.

3. The printing apparatus according to claim 1, wherein the message is displayed in response to a start instruction of the print operation.

4. The printing apparatus according to claim 1, wherein the stacker includes a stacking sensor configured to detect a presence or an absence of a stacked sheet on the stacker, and
wherein the controller resumes the print operation of the printer when it is determined, based on detection information of the stacking sensor, that the stacked sheets are removed from the stacker, in a case where the print operation is stopped.

5. The printing apparatus according to claim 1, wherein a detection function of the stacking sensor is disabled in conjunction with the lowering of the movable stopper.

6. The printing apparatus according to claim 1, further comprising an original reading device configured to read an image on an original,
wherein the printer executes the print operation based on the image on the original read by the original reading device, and
wherein the controller requires a number of copies based on a number of original sheets, and, in a case where the number of copies is less than a predetermined number, causes the display unit not to display the message even if the mode of the printing apparatus is set to the second mode.

7. The printing apparatus according to claim 1, wherein the sheet processor has a saddle stitching mechanism for performing a stitching processing for a central portion of one of the printed sheets.

8. The printing apparatus according to claim 1, wherein the sheet processor has a middle folding mechanism for folding at least one of the printed sheets in half.

9. A method for controlling a printing apparatus that includes:
a printer configured to print images on sheets;
a sheet processor configured to execute bookbinding processing on the printed sheets on which images are printed by the printer;
a stacker, on which processed sheets, resulting from the bookbinding processing having been executed on the printed sheets by the sheet processor, are stacked; and
a movable stopper configured to prevent dropping of the processed sheets stacked on the stacker,
the method comprising:
setting, based on a user instruction, a first mode or a second mode;
stopping a print operation of the printer based on an amount of stacked sheets on the stacker and restarting the print operation when the stacked sheets are removed from the stacker, in a case where a mode of the printing apparatus is set to the first mode;
continuing the print operation regardless of the amount of stacked sheets on the stacker in a case where the mode of the printing apparatus is set to the second mode; and
displaying, on a display unit, a message for prompting a user to lower the movable stopper in a case where the mode of the printing apparatus is set to the second mode.

10. A printing apparatus comprising:
a printer configured to print images on sheets;
a sheet processor configured to execute bookbinding processing on the printed sheets on which images have been printed by the printer;
a stacker, on which processed sheets, resulting from the bookbinding processing having been executed on the printed sheets by the sheet processor, are stacked;

a movable stopper configured to prevent dropping of the processed sheets stacked on the stacker;
a controller configured to:
(i) set, based on a user instruction, a first mode or a second mode,
(ii) stop a print operation of the printer based on a number of stacked sheets on the stacker and restart the print operation when the stacked sheets are removed from the stacker, in a case where a mode of the printing apparatus is set to the first mode, and
(iii) continue the print operation regardless of the number of stacked sheets on the stacker in a case where the mode of the printing apparatus is set to the second mode; and
a display unit configured to display a message for prompting a user to lower the movable stopper in a case where the mode of the printing apparatus is set to the second mode.

11. A printing apparatus comprising:
a printer configured to print images on sheets;
a sheet processor configured to execute bookbinding processing on the printed sheets on which images have been printed by the printer;
a stacker, on which processed sheets, resulting from the bookbinding processing having been executed on the printed sheets by the sheet processor, are stacked;
a movable stopper configured to prevent dropping of the processed sheets stacked on the stacker;
a controller configured to:
(i) set, based on a user instruction, a first mode or a second mode,
(ii) stop a print operation of the printer and restart the print operation when the stacked sheets are removed from the stacker, in a case where a number of printed sheets by the printer exceeds a threshold value and a mode of the printing apparatus is set to the first mode, and
(iii) continue the print operation even if the number of printed sheets by the printer exceeds the threshold value in a case where the mode of the printing apparatus is set to the second mode; and
a display unit configured to display a message for prompting a user to lower the movable stopper in a case where the mode of the printing apparatus is set to the second mode.

12. A printing apparatus comprising:
a printer configured to print images on sheets;
a sheet processor configured to execute bookbinding processing on the printed sheets on which images have been printed by the printer;
a stacker, on which processed sheets, resulting from the bookbinding processing having been executed on the printed sheets by the sheet processor, are stacked;
a movable stopper configured to prevent dropping of the processed sheets stacked on the stacker;
a controller configured to:
(i) set, based on a user instruction, a first mode or a second mode, and
(ii) perform a stack restriction processing for stopping a print operation of the printer based on an amount of sheets printed by the printer and restart the print operation when the stacked sheets are removed from the stacker, in a case where a mode of the printing apparatus is set to the first mode, wherein the stack restriction processing is not performed in a case where the mode of the printing apparatus is set to the second mode; and
a display unit configured to display a message for prompting a user to lower the movable stopper in a case where the mode of the printing apparatus is set to the second mode.

13. A printing apparatus comprising:
a printer configured to print images on sheets;
a sheet processor configured to execute bookbinding processing on the printed sheets on which images have been printed by the printer;
a stacker on which bookbinding products are stacked, each bookbinding product being a bundle of processed sheets on which the bookbinding processing has been executed on the printed sheets by the sheet processor;
a movable stopper configured to prevent dropping of the bookbinding products stacked on the stacker;
a controller configured to:
(i) set, based on a user instruction, a first mode or a second mode,
(ii) stop a print operation of the printer based on a number of copies of the stacked bookbinding products on the stacker and restart the print operation when the stacked bookbinding products are removed from the stacker, in a case where a mode of the printing apparatus is set to the first mode, and
(iii) continue the print operation regardless of the number of copies of stacked bookbinding products on the stacker in a case where the mode of the printing apparatus is set to the second mode; and
a display unit configured to display a message for prompting a user to lower the movable stopper in a case where the mode of the printing apparatus is set to the second mode.

14. A printing apparatus comprising:
a printer configured to print images on sheets based on a print job;
a sheet processor configured to execute bookbinding processing on the printed sheets on which images have been printed by the printer;
a stacker, on which processed sheets, resulting from the bookbinding processing having been executed on the printed sheets by the sheet processor, are stacked;
a movable stopper configured to prevent dropping of the processed sheets stacked on the stacker; and
a controller configured to temporarily stop the print job based on an amount of stacked sheets on the stacker in a case where a mode of the printing apparatus is set to a first mode, and to continue the print job regardless of the amount of stacked sheets on the stacker in a case where the mode of the printing apparatus is set to a second mode,
wherein the mode of the printing apparatus is set to the second mode in response to the movable stopper being lowered by a user.

15. The printing apparatus according to claim 14,
wherein a sheet stacking surface of the stacker is tilted, and
wherein the movable stopper prevents the stacked sheets on the sheet stacking surface of the stacker from dropping by a self-weight of the stacked sheets.

16. The printing apparatus according to claim 14, wherein the stacker includes a stacking sensor configured to detect a presence or an absence of a stacked sheet on the stacker, and
wherein the controller resumes a print operation of the printer when it is determined, based on detection information of the stacking sensor, that the stacked sheets are removed from the stacker, in a case where the print operation is stopped.

17. The printing apparatus according to claim 16, wherein a detection function of the stacking sensor is disabled in conjunction with the lowering of the movable stopper.

18. The printing apparatus according to claim 14, further comprising an original reading device configured to read an image on an original,
wherein the printer executes the print operation based on the image on the original read by the original reading device, and
wherein the controller requires a number of copies based on a number of original sheets, and, in a case where the number of copies is less than a predetermined number, causes the display unit not to display the message even if the mode of the printing apparatus is set to the second mode.

19. The printing apparatus according to claim 14, wherein the sheet processor has a saddle stitching mechanism for performing a stitching processing for a central portion of at least one of the stacked sheets.

20. The printing apparatus according to claim 14, wherein the sheet processor has a middle folding mechanism for folding at least one of the stacked sheets in half.

21. A printing apparatus comprising:
a printer configured to print images on sheets based on a print job;
a sheet processor configured to perform bookbinding processing on the printed sheets conveyed from the printer;
a stacker on which booklets are stacked, each booklet being a bundle of the printed sheets on which the bookbinding processing has been executed by the sheet processor;
a stopper configured to prevent dropping of the booklets stacked on the stacker, the stopper being movable between a first position and a second position, wherein the first position is a position where the dropping of the booklets stacked on the stacker is prevented, and the second position is a position where the dropping of the booklets stacked on the stacker is not prevented; and
a controller configured to, in a case where the stopper is positioned at the first position, interrupt the print job based on an amount of the booklets stacked on the stacker, and in a case where the stopper is positioned at the second position, continue the print job regardless of the amount of the booklets stacked on the stacker.

22. The printing apparatus according to claim 21,
wherein a sheet stacking surface of the stacker is tilted, and
wherein the stopper prevents dropping of the booklets stacked on the sheet stacking surface of the stacker.

23. The printing apparatus according to claim 21,
wherein the stacker includes a stacking sensor configured to detect a presence or an absence of a stacked sheet on the stacker, and
wherein the controller resumes the print job when it is determined, based on detection information of the stacking sensor, that the stacked sheets are removed from the stacker.

24. The printing apparatus according to claim 23, wherein a detection function of the stacking sensor is disabled in conjunction with the moving of the stopper from the first position to the second position.

25. The printing apparatus according to claim 21, further comprising an original reading device configured to read an image on an original,
wherein the printer prints the image on the sheet based on the image on the original read by the original reading device.

26. The printing apparatus according to claim 21, wherein the sheet processor has a saddle stitching mechanism for performing a stitching processing for a central portion of at least one of the stacked sheets.

27. The printing apparatus according to claim 21, wherein the sheet processor has a middle folding mechanism for folding at least one of the stacked sheets in half.

* * * * *